United States Patent
Aouad et al.

(10) Patent No.: US 6,887,524 B2
(45) Date of Patent: May 3, 2005

(54) METHOD FOR MANUFACTURING LAUNDRY ADDITIVE ARTICLE

(75) Inventors: Yousef Georges Aouad, Cincinnati, OH (US); Rajan Keshav Panandiker, West Chester, OH (US); Shannon Dale Wagers, Hamilton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/058,717

(22) Filed: Jan. 28, 2002

(65) Prior Publication Data

US 2003/0118730 A1 Jun. 26, 2003

Related U.S. Application Data

(63) Continuation-in-part of application No. 09/973,440, filed on Oct. 9, 2001, and a continuation-in-part of application No. 09/973,445, filed on Oct. 9, 2001.
(60) Provisional application No. 60/240,343, filed on Oct. 13, 2000, and provisional application No. 60/240,320, filed on Oct. 13, 2000.

(51) Int. Cl.$^7$ ................................................ B05D 1/36
(52) U.S. Cl. ..................... 427/359; 427/411; 427/412
(58) Field of Search ............................ 427/411, 412, 427/359

(56) References Cited

U.S. PATENT DOCUMENTS

| | | | |
|---|---|---|---|
| 3,414,459 A | | 12/1968 | Wells |
| 3,673,110 A | * | 6/1972 | Edwards ................. 510/513 |
| 3,694,364 A | | 9/1972 | Edwards |
| 3,816,321 A | * | 6/1974 | Kleinschmidt ............ 510/295 |
| 3,853,758 A | | 12/1974 | Hurwitz et al. |

(Continued)

FOREIGN PATENT DOCUMENTS

| | | |
|---|---|---|
| EP | 0 325 944 A1 | 1/1989 |
| EP | 0 341 205 | 11/1989 |
| EP | 0 510 246 | 10/1992 |
| EP | 0 634 486 A1 | 1/1995 |
| EP | 0 753 566 A2 | 1/1997 |
| EP | 0 779 358 | 6/1997 |
| EP | 0 844 006 | 5/1998 |
| EP | 1 020 513 A2 | 7/2000 |
| EP | 1170356 * | 1/2002 |
| JP | 07024951 | 7/1993 |
| JP | 07-316590 * | 12/1995 |
| WO | WO 95 / 03390 * | 2/1995 |
| WO | WO 95/03765 | 2/1995 |
| WO | WO 96/00548 | 1/1996 |
| WO | WO 96 / 37598 * | 11/1996 |
| WO | WO 97/42286 | 11/1997 |
| WO | WO 97/42290 | 11/1997 |

(Continued)

OTHER PUBLICATIONS

Kirk–Othermer Encyclopedia of Chemical Technology; 3$^{rd}$ Edition; vol. 6; pp. 386–426.

Primary Examiner—Erma Cameron
(74) Attorney, Agent, or Firm—Marianne Dressman; Julia A. Glazer; Brahm J. Corstanje

(57) ABSTRACT

A method for manufacturing a laundry additive article wherein a polymerizable or crosslinkable dye or particulate soil absorber is applied to one face of a substrate web and a cross-linker is separately applied to the coating of the dye or particulate soil absorber to cross-link the dye or particulate soil absorber on the substrate such that the dye or particulate soil absorber does not dissolve in the wash water. In accordance with one embodiment, the dye or particulate soil absorber and the cross-linker are applied as aqueous based solutions. Other laundry additives may be applied to the substrate using other coating techniques and particularly as a waxy or hot melt composition.

7 Claims, 4 Drawing Sheets

U.S. PATENT DOCUMENTS

| | | | |
|---|---|---|---|
| 3,905,863 A | | 9/1975 | Ayers |
| 3,929,135 A | | 12/1975 | Thompson |
| 3,929,678 A | * | 12/1975 | Laughlin et al. ............ 510/349 |
| 3,944,694 A | | 3/1976 | McQueary |
| 3,956,556 A | | 5/1976 | McQueary |
| 3,974,025 A | | 8/1976 | Ayers |
| 4,007,300 A | | 2/1977 | McQueary |
| 4,012,540 A | | 3/1977 | McQueary |
| 4,065,257 A | | 12/1977 | Coe et al. |
| 4,118,525 A | | 10/1978 | Jones |
| 4,191,609 A | | 3/1980 | Trokhan |
| 4,199,464 A | | 4/1980 | Cambre |
| 4,254,139 A | | 3/1981 | Hendrickson et al. |
| 4,259,217 A | * | 3/1981 | Murphy ...................... 510/345 |
| 4,273,878 A | | 6/1981 | Amick |
| 4,324,246 A | | 4/1982 | Mullane et al. |
| 4,342,314 A | | 8/1982 | Radel et al. |
| 4,380,453 A | | 4/1983 | Claiborne |
| 4,463,045 A | | 7/1984 | Ahr et al. |
| 4,494,264 A | * | 1/1985 | Wattiez et al. ................. 8/150 |
| 4,624,890 A | | 11/1986 | Lloyd et al. |
| 4,780,352 A | | 10/1988 | Palumbo |
| 4,830,784 A | | 5/1989 | Meffert et al. |
| 5,006,394 A | | 4/1991 | Baird |
| 5,374,334 A | | 12/1994 | Sommese et al. |
| 5,451,337 A | | 9/1995 | Liu et al. |
| 5,474,576 A | | 12/1995 | Thoen et al. |
| 5,478,489 A | | 12/1995 | Fredj et al. |
| 5,507,968 A | | 4/1996 | Palaikis |
| 5,520,875 A | | 5/1996 | Wnuk et al. |
| 5,534,182 A | | 7/1996 | Kirk et al. |
| 5,627,151 A | | 5/1997 | Detering et al. |
| 5,698,476 A | | 12/1997 | Johnson et al. |
| 5,773,545 A | * | 6/1998 | Schade et al. .............. 526/262 |
| 5,804,662 A | * | 9/1998 | Schade et al. .............. 525/262 |
| 5,830,844 A | * | 11/1998 | Detering et al. ............ 510/475 |
| 5,881,412 A | | 3/1999 | Ziskind |
| 5,964,939 A | * | 10/1999 | Fox et al. ................... 510/516 |
| 6,008,316 A | | 12/1999 | Foster, Jr. et al. |
| 6,140,293 A | | 10/2000 | Lappas |
| 6,277,810 B2 | | 8/2001 | Baines et al. |
| 6,410,496 B1 | | 6/2002 | Masschelein et al. |
| 2002/0119721 A1 | | 8/2002 | Panandiker et al. |
| 2003/0139320 A1 | | 7/2003 | Catalan et al. |
| 2003/0158075 A1 | | 8/2003 | Panandiker et al. |

FOREIGN PATENT DOCUMENTS

| | | | |
|---|---|---|---|
| WO | WO 98/29528 | | 7/1998 |
| WO | WO 98 / 49259 | * | 11/1998 |
| WO | WO 98/49259 | | 11/1998 |
| WO | WO 99/14295 | | 3/1999 |
| WO | WO 99/15614 | | 4/1999 |
| WO | WO 00/35880 | | 6/2000 |
| WO | WO 02/33040 A1 | | 4/2002 |

* cited by examiner

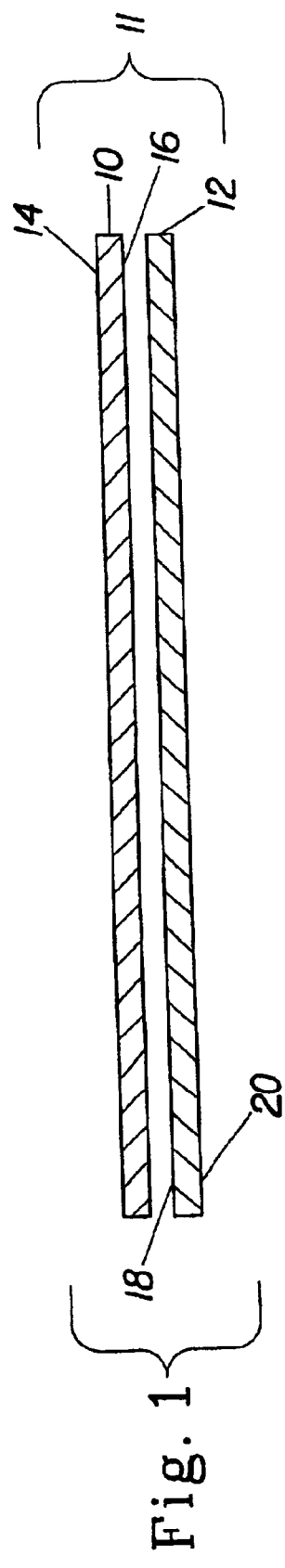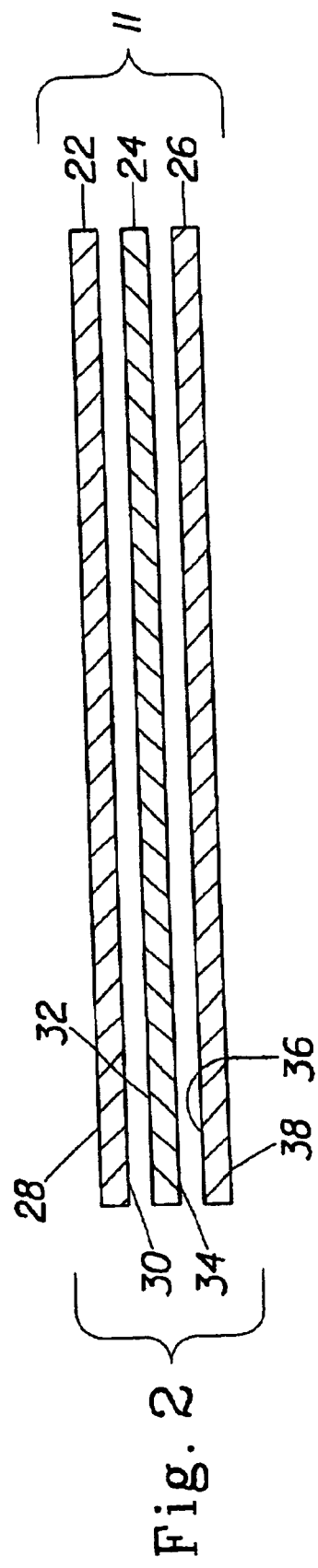

US 6,887,524 B2

METHOD FOR MANUFACTURING LAUNDRY ADDITIVE ARTICLE

CROSS-REFERENCE TO RELATED APPLICATIONS

This application is a continuation-in-part of U.S. applications Ser. Nos. 09/973,440, filed Oct. 9, 2001 and 09/973,445, filed Oct. 9, 2001.

FIELD OF THE INVENTION

The present invention relates to a method for manufacturing a laundry additive article that absorbs extraneous dyes or particulate soil and prevents their redeposition on garments when laundered. Optionally, the article may deliver soluble dye transfer inhibitors and/or other organic or inorganic water soluble or water insoluble additives and combinations thereof into the wash liquor. More particularly the invention relates to a method in which polymerizable or crosslinkable dye or particulate soil absorbers, are cross-linked on a substrate to which they then become fixed. The cross-linked polymers selectively remove extraneous dyes or particulate soil from the wash water before redeposition onto other articles or garments. The invention more particularly relates to a method in which the dye or particulate soil absorber is applied to the substrate and cross-linked in situ on the substrate into a water insoluble matrix. The invention further relates to a method for manufacturing a laundry article in which other additives are added to the laundry article in addition to the dye or particulate soil absorbers. These other additives may be soluble or insoluble in the wash water.

BACKGROUND OF THE INVENTION

One problem that has persistently troubled the fabric care industry has been the problem of dyes bleeding from colored articles and/or garments in the washing machine and then redepositing on lighter-colored articles and/or garments in the same wash load. Several attempts have been made to try to remedy this problem of "fugitive dyes." Several methods have been developed to address this problem of unwanted dye transfer. Methods designed to increase the affinity of fabrics for dyes have not been able to resolve the problem of the fabric releasing the dyes in the washing solution. Another approach has been to bleach the dyes that are released into the washing solution before they have a chance to transfer to other articles and/or garments (U.S. Pat. No. 5,451,337, U.S. Pat. No. 5,474,576). The use of bleaching agents has the undesirable effect of bleaching not only the fugitive dyes, but also bleaching the dyes still attached to the articles and/or garments, resulting in fading or color change of the dyed articles and/or garments. The oxidizing agents can also interfere with laundry detergent components, making the detergents less effective.

Polymers have been used as dye transfer inhibitors (U.S. Pat. No. 5,698,476, U.S. Pat. No. 5,534,182, U.S. Pat. No. 5,478,489, U.S. Pat. No. 4,065,257) and as dye absorbers (U.S. Pat. No. 5,698,476, U.S. Pat. No. 3,816,321, U.S. Pat. No. 3,694,364, EP Pat. Appl. 0 341 205), again with unsatisfactory results. Polymers chosen as dye transfer inhibitors thus far have been cationic, to facilitate interaction with dyes which are known to those skilled in the art to be anionic. Cationic polymers have been used as laundry additives in both soluble and insoluble forms. The cationic polymers do bind with the anionic dyes, but they are non-selective and bind to other anionic compounds in the wash solution, such as anionic surfactants which are present at much higher concentrations than fugitive dyes, decreasing the efficiency of the dye inhibitor and the detergent's cleaning power. They also tend to bind the optical brighteners, another anionic component of laundry detergents. Binding the optical brighteners makes the laundered clothes appear less bright and clean and the consumer perceives the detergent as being less effective. Furthermore, and perhaps most significant, the soluble cationic polymers tend to bind to articles of clothing in the wash solution, then act as dye absorbers, absorbing and then permanently fixing the fugitive dyes to the articles and/or garments.

Recently, the above methods have been combined to try to circumvent problems inherent in the individual methods, again with only limited success. One method discloses the combination of a dye transfer inhibiting water-soluble cationic polymer, which absorbs fugitive dyes, and an oxidizing agent (U.S. Pat. No. 5,478,489). The problem still remaining is that some cationic polymer is attracted to articles and/or garments, adsorbs to the articles and/or garments and then absorbs and fixes unwanted fugitive dyes to those articles and/or garments. Other recent inventions have used cationic polymers bound to substrates to take up fugitive dyes. By incorporating the cationic polymers into a substrate, the binding of these polymers to the articles and/or garments and subsequent transfer of dye to the garment is intended to be eliminated. However, the cationic polymers are never completely insoluble, so the problem persists. U.S. Pat. No. 5,698,476 discloses a system which uses a cationic polymer dye absorber bound to a substrate in combination with a soluble dye transfer inhibitor. The expectation was that since both the cationic dye absorber and the dye transfer inhibitor capture some portion of the fugitive dye the adsorption of fugitive dyes onto other articles and/or garments would be eliminated. Unfortunately, this method, too, has been found unsatisfactory. Using this dual method the dyes are scavenged from the laundering solution, but again, the cationic polymers cannot be made completely insoluble; they are, in fact, up to 20% soluble. The result is that there is always some soluble cationic material that then adsorbs to articles and/or garments, absorbing and fixing fugitive dyes to those articles and/or garments.

In response to the foregoing needs, in co-pending U.S. application Ser. No. 09/973,445 filed Oct. 13, 2001 a laundry additive article is described in which a cross-linked polymeric dye absorber is fixed to the surface of an insoluble substrate such as a cellulosic sheet. While this article has been effective, the commercial manufacture of this article presents its own difficulties because the viscosity of the solution of the polymeric dye absorber is high and if the cross-linker is added to the polymeric dye absorber before coating, the viscosity of the solution gradually builds to even higher levels. These properties make it difficult to manufacture on a commercial scale an article that carries enough of the dye absorber to provide the required laundry protective effect and that holds or retains the dye absorber on the face of the article without having it dissolve in the wash water. It is also difficult to locate or position the dye absorber within the substrate in a manner in which it is effective in absorbing fugitive dyes and yet it is not dissolved or dislodged from the substrate during the normal laundry cycle.

SUMMARY OF INVENTION

The present invention addresses the aforementioned manufacturing problems by providing a method in which a coating of a polymerizable or cross-linkable dye or particulate soil absorber, such as a polymeric amine, is applied to a web and reactively cross-linked on the web with a cross-linker that is separately applied to provide a reactive coating that cross-links and remains attached to the web and is not released into the wash water. In accordance with one embodiment of the invention, the dye or particulate soil absorber is drawn into the web and cross-linked such that during washing at least 90% and preferably at least 95% of the dye or particulate soil absorber is retained on the web. In one embodiment, the dye or particulate soil absorber may be applied to the web using a slot die coater. To draw the dye or particulate soil absorber into the web to a location at which the absorber is effective yet it is retained on the web, a vacuum may be applied to the opposite face of the web. The cross-linker is applied to the web independently and reacted with the dye or particulate soil absorber on the surface of the web. In one embodiment, this reaction is accomplished by conveying the coated material through an oven.

One manifestation of the invention is a method for manufacturing a laundry additive article that absorbs extraneous dyes and prevents their redeposition which comprises: providing a web of an insoluble substrate, applying a coating of a polymerizable or crosslinkable dye or particulate soil absorber to one face of the web, drawing the coating of the dye or particulate soil absorber into the web, applying a cross-linker for the dye or particulate soil absorber to the coating, and reacting the cross-linker with the polymerizable or cross-linkable polymers on the surface of the coating. While this method applied equally to aqueous and non-aqueous polymers, in a preferred embodiment of the invention, the dye or particulate soil absorber and the cross-linker are applied to the substrate in their aqueous form.

In accordance with another manifestation of the invention other laundry additives are applied to the substrate. Unlike the cross-linked dye or particulate soil absorber, these additives may perform functions, such as acting as a whitening agent, in which they are designed to dissolve in the wash water.

In a further manifestation of the invention other additives may be applied to the laundry additive article as non-aqueous polymers with high melting points such as waxy or hot melt compositions. More particularly, these compositions may be applied at the back end of the process to either side of the web and fixed to the web by chilling, for example by passing the coated web over one or more chill rolls.

In one embodiment of the invention, the total amount of ingredients applied to the web on a dry basis is about 0.1 to 3.0 times the weight of the web.

BRIEF DESCRIPTION OF THE DRAWINGS

FIG. 1. is a cross sectional view of a multi-layer dye-scavenging article of the present invention.

FIG. 2. is a cross sectional view of an alternative embodiment of a multi-layer dye-scavenging article of the present invention.

DETAILED DESCRIPTION OF THE INVENTION

The Dye Absorber

Figure 3:
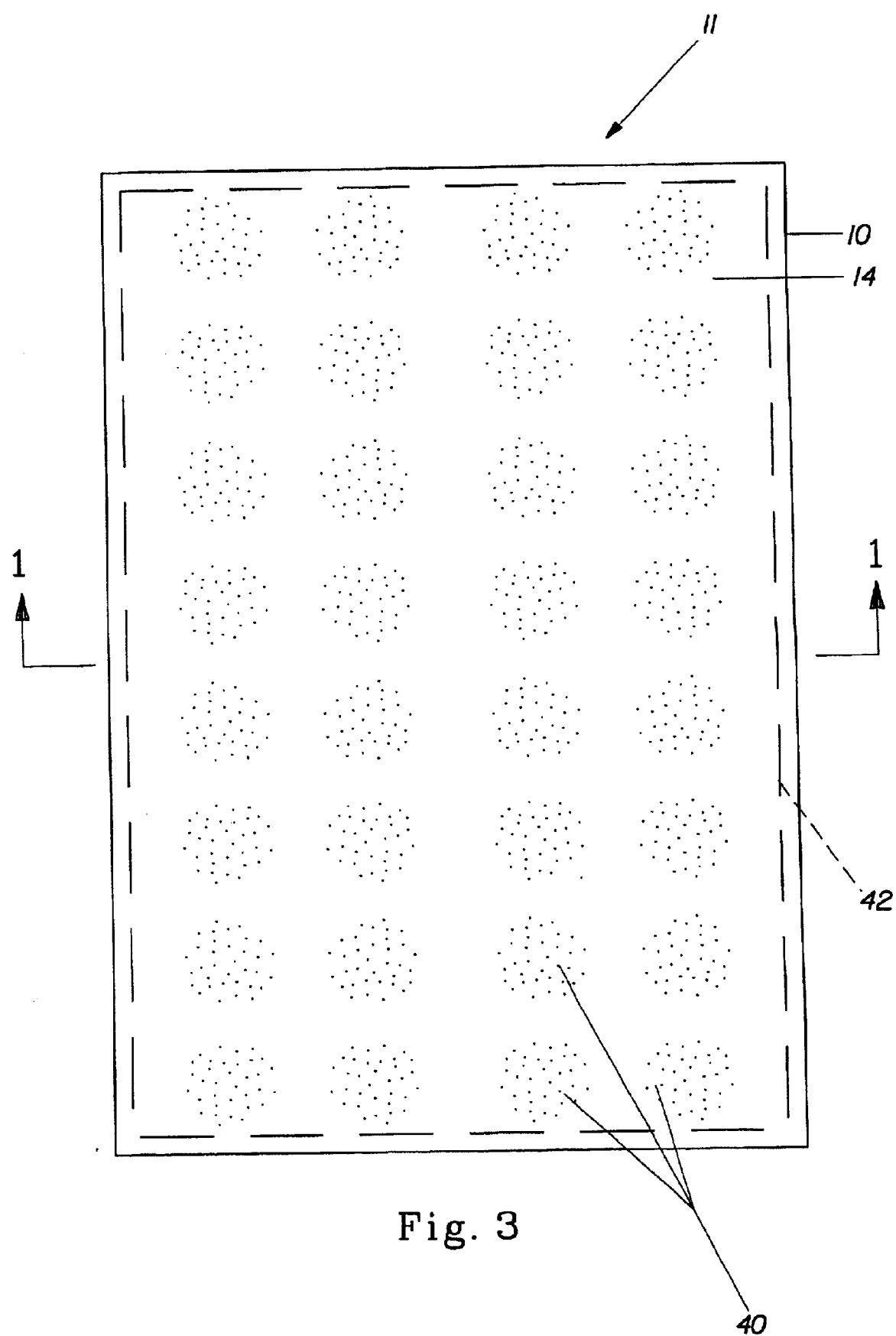
FIG. 3. is a top view of a multi-layer article manufactured in accordance with one embodiment of the present invention.

The dye absorber binds fugitive dyes preferentially over other agents present in a wash solution, such as detergent components and fabrics. The dye selectivity is due to the nature of the dye binding process. Traditionally, dye absorbers have been quaternary ammonium compounds, chosen to interact with the anionic dyes used on fabrics. However, anionic surfactants, which are major components of laundry detergents, are present in the wash solution in much greater concentrations than fugitive dyes. The result is that quaternary ammonium dye absorbers bind much more surfactant than dye, decreasing the efficiency of both the dye absorber and the detergent.

It has been discovered that by relying on interactions other than anionic-cationic, effective and selective dye absorbers may be produced. Some interactions that may be used advantageously include, but are not limited to, aromatic—aromatic interactions, charge interactions, hydrogen bonding, absorbing, adsorbing, complexing, or otherwise tying up fugitive dye molecules. The most preferable method according to this invention is an aromatic—aromatic interaction. In addition to being anionic, dyes used on fabrics are aromatic in nature. By using a dye absorber that also contains aromatic functionalities, the dye and dye absorber can interact strongly enough to remove fugitive dyes from the wash solution and hold them in the insoluble dye absorber polymer matrix, preventing them from redepositing on other fabrics in the wash solution. One added benefit is that the aromatic dye absorber does not bind the surfactants present in the detergent, so detergent efficiency is not affected. Furthermore, since the dye absorber does not get bound up with non-dye agents, it is more effective than conventional cationic dye absorbers. A second benefit is that any small amount of dye absorber that is solubilized in the wash solution does not bind to clothes, instead, it acts as a dye transfer inhibitor, advantageously keeping dyes from redepositing on fabrics in the wash solution.

The amount of dye absorber used in the laundry additive article falls within the range of about 0.1 to 5 g per article or about 1 to 50 gsm. As these laundry additive articles are intended to be single use, an effective amount of dye absorber per wash load is about 0.1 to 5 g. The preferred amount is about 1 g of dye absorber per article or 10 gsm. It should be understood and recognized by one of skill in the art that the amount of dye absorber can be adjusted based on the size of the wash load or the size of the substrate and still be within the spirit of the invention.

The polymeric amine dye absorbers are made substantially insoluble through cross-linking. The polymers may be cross-linked prior to introduction to the web and subsequently adhered to the web; cross-linked simultaneously with their introduction to the web; or cross-linked after introduction to the web. In accordance with the substantially insoluble nature of the dye absorber, the maximum solubility is less than about 20% by weight. Preferably, less than about 5% of the dye absorber will be soluble in an aqueous wash solution. In accordance with the invention, polymerization and cross-linking are done directly on the web of insoluble substrate.

The cross-linked polymeric amine may be formed by cross-linking soluble amine-containing molecules by reacting them with reactive cross-linking agents. The appropriate cross-linking agent is chosen with respect to the functional groups on the monomer. Polyamines can be chosen from polymers, oligomers, prepolymers, monomers, or mixtures of those, having functional groups such as hydroxyl, amine, ester, ketone or amide, or mixtures thereof.

Crosslinking agents are selected such that they react with the functional group of the polyamine to form a crosslinked polymeric network. Cross-linking agents which are suitable for use in the present invention contain reactive groups such as epihalohydrins, alkylene dihalide, alkylene triahalide epoxide, azetedinium group, glyoxal and isocyanate group.

Examples of crosslinking agents are epihalohydrin, bishalohydrins of diols, bishalohydrins of polyalkylene glycols, bishalohydrins of polytetrahydrofurans, alkylene dihalides, alkylene trihalides, bisepoxides, trisepoxides, tetraepoxides, or mixtures thereof. Particulary preferred are epichlorohydrin, bisphenol A, triglycidyl ethers such as trimethylolpropane triglycidyl ether and glycerolpropoxylate triglycidyl ether.

Another group of crosslinking agents are reactive wet strength resins described by L. L. Chan in Wet Strength Resins and their Application, Tappi Press 1994. Preferred wet strength resins are polyamidoamine-epichlorohydrin resins and polymeric amine-epichlorohydrin resins, (PAE resins). These resins are produced by a polycondensation reaction of a polyalkylenepolyamine with a polycarboxylic acid and then reacting the condensate with epihalohydrin. They can also be produced by condensing polyalkylenepolyamine with a dihalide and subsequent reaction with epichlorohydrin. Examples of PAE resins are Kymene 557H, Kymene 450, Kymene 736, Kymene557LX, all supplied by Hercules Inc., of Wilmington, Del. and Leuresin KNU supplied by BASF, AG Ludwigschaefen, Germany. Another preferred class of crosslinking resins is glyoxalated polymers, preferably glyoxalated polyacrylamide polymers. These polymers can be applied as a solution or as an emulsion polymer or latex. Typically, the PAE resins are applied in coat weights of about 1 to about 30 gsm. One skilled in the art would also recognize that other suitable cross-linking agents may be used.

The water-soluble polyamines may be formed by reacting condensates of soluble amines with a cross-linking agent. The condensates of soluble amines may be selected from linear alkylamines, branched alkylamines, cycloalkylamines, alkoxyamines, amino acids, cyclic amines containing at least one nitrogen atom in a ring structure, alkenediamines, polyetherdiamines, polyalkylenepolyamines, mixtures of an amine with at least one amino acid, and mixtures thereof. Cross-linking agents may be selected from epihalohydrins, bishalohydrins of diols, bishalohydrins of polyalkylene glycols, bishalohydrins of polytetrahydrofuran, alkylene dihalides, alkylene trihalides, bisepoxides, trisepoxides, tetraepoxides, and mixtures thereof.

Specific examples of suitable consendates include methylamine, ethylamine, n-propylamine, isopropylamine, n-butylamine, isobutylamine, pentylamine, hexylamine, heptylamine, octylamine, 2-ethylhexylaamine, isooctylamine, nonylamine, isononylamine, decylamine, undecylamine, dodecyclamine, tridecylamine, stearylamine, palmitylamine, dimethylamine, diethylamine, dipropylamine, dibutylamine, dipentylamine, dihexylamine, bis-(2-ethylhexyl)amine, ditridecylamine, N-methylbutylamine, N-ethylbutylamine, piperidine, morpholine, pyrrolidine, 2-methoxyethylamine, 2-ethoxyethylamine, 3-ethoxypropylamine, 3-ethoxypropylamine, 3-[(2-ethylhexyl)oxy]-1-propaneamine, 3-[(2-methoxyethoxy]-1-propaneamine, 2-methoxy-N-(2-methoxyethyl)ethanamine, 2-aminoethanol, 3-amino-1-propanol, 1-amino-2-propanol, 2-(2-aminoethoxy)ethanol, 2-[(2-aminoethyl)amino]ethanol, 2-(methylamino)ethanol, 2-(ethylamino)ethanol, 2-(butylamino)ethanol, diethanolamine, 3-[(2-hydroxyethyl)amino]1-propanol, diisopropanolamine, bis-(2-hydroxyethyl)aminoethylamine, bis-(2-hydroxypropyl)aminoethylamine, bis-(2-hydroxyethyl)aminopropyl-amine, bis-(2-hydroxypropyl)aminopropylamine, cyclopentylamine, cyclohexylamine, N-methylcyclohexylamnine, N-ethylcyclohexylamine, dicyclohexylamine, ethylenediamine, propylenediamine, butylenediamine, neopentyldiamine, hexamethylenediamine, octamethylenediamine, isophoronediamine, 4,4'-methylenebiscyclohexylamine, 4,4'-methylenebis(2-methylcyclohexylamine), 4,7-dioxadecyl-1,10-diamnine, 4,9-dioxadodecyl-1,12-diamine, 4,7,10-trioxatridecyl-1,13-diamine, 2-(ethylamnino)ethylamine, 3-(methylamino)propylamine, 3-(cyclohexylamino)propylamine, 3-aminopropylamine, 2-(diethylamnino)ethylamine, 3-(dimethylamino)propylamine, 3-(diethylamino)propylamine, dipropylenetriamine, tripropylenetetramnine, N,N-bis-(aminopropyl)methylamine, N,N-bis-(aminopropyl)ethylamine, N,N-bis-(aminopropyl)hexylamine, N,N-bis-(aminopropyl)octylamine, 1,1-dimethyldipropylenetriamine, N,N-bis-(3-dimethylaminopropyl)amine, N,N'-1,2-ethanediylbis-(1,3-propanediamine), diethylenetriamnine, bis-(aminoethyl)ethylenediamine, bis-(aminopropyl)ethylenediamine, bis-(hexamethylene)triamine, N-(aminoethyl)hexamethylenediamine, N-(aminopropyl)hexamethylenediamine, N-(aminopropyl)ethylenediarnine, N-(aminoethyl)butylenediamine, N-(aminopropyl)butylenediamine, bis-aminoethyl)hexamethylenediamine, bis-(aminopropyl)hexamethylenediamine, bis-(aminoethyl)butylenediamine, bis-(aminopropyl)butylenediamine, 4-aminomethyloctane-1,8-diamine, and N,N-diethyl-1,4-pentanediamine.

Cyclic amines containing at least one nitrogen atom in a ring structure are for example monoaminoalkylpiperazines, bis(aminoalkyl)piperazines, monoaminoalkylimidazoles, aminoalkylmorpholines, aminoalkylpiperidines and aminoalkylpyrrolidines. The monoaminoalkylpiperazines are, for example, 1-(2-aminoethyl)piperazine and 1-(3-aminopropyl)piperazine. Preferred monoaminoalkylimidazoles have 2 to 8 carbons atoms in the alkyl group. Examples of suitable compounds are 1-(2-aminoethyl)imidazole and 1-(3-aminopropyl)imidazole. Suitable bis(aminoalkyl)piperazines are for example 1,4-bis(2-aminoethyl)piperazine and 1,4-bis(3-aminopropyl)-piperazine. Preferred aminoalkylmorpholines are aminoethylmorpholine and 4-(3-aminopropyl)morpholine. Other preferred compounds of this group are aminoethylpiperidine, aminopropylpiperidine and aminopropylpyrrolidine.

Cyclic amines with at least two reactive nitrogen atoms in the ring are for example imidazole, C-alkyl substituted imidazoles having 1 to 25 carbon atoms in the alkyl group such as 2-methylimidazole, 2-ethylimidazole, 2-propylimidazole, 2-isopropylimidazole and 2-isobutylimidazole, imidazoline, C-alkyl substituted imidazolines having 1 to 25 carbon atoms in the alkyl group and arylimidazolines such as 2-phenylimidazoline and 2-tolylimidazoline, piperazine, N-alkylpiperazines having 1 to 25 carbon atoms in the alkyl group such as 1-ethylpiperazine, 1-(2-hydroxy-1-ethyl)piperazine, 1-(2-hydroxy-1-propyl)piperazine, 1-(2-hydroxy-1-butyl)piperazine, 1-(2-hydroxy-1-pentyl)piperazine, 1-(2,3-dihydroxy-1-propyl)piperazine, 1-(2-hydroxy-3-phenoxyethyl)piperazine, 1-(2-hydroxy-2-phenyl-1-ethyl)piperazine, N,N'-dialkylpiperazines having 1 to 25 carbon atoms in the alkyl group for example 1,4-dimethylpiperazine, 1,4-diethylpiperazine, 1,4-dipropylpiperazine, 1,4-dibenzylpiperazine, 1,4-bis(2-hydroxy-1-ethyl)piperazine, 1,4-bis(2-hydroxy-1-propyl)piperazine, 1,4-bis(2-hydroxy-1-butyl)piperazine, 1,4-bis(2-hydroxy-1-pentyl)piperazine, and 1,4-bis(2-hydroxy-2-phenyl-1-ethyl)piperazine. Other cyclic amines with at least two reactive nitrogen atoms are melamine and benzimidazoles such as 2-hydroxybenzimidazole and 2-aminobenzimidazole. Preferred cyclic amines with at least two reactive nitrogen atoms are imidazole, 2-methylimidazole, 4-methylimidazole and piperazine.

The amine may be selected from the group consisting of (i) at least one cyclic amine containing at least two reactive nitrogen atoms and (ii) mixtures of at least one cyclic amine containing at least two reactive nitrogen atoms with at least one other amine containing 1 to 6 nitrogen atoms. Examples of other amines containing 1 to 6 nitrogen atoms of which at least one is not quaternary are linear alkyl amines having 1 to 22 carbon atoms in the alkyl group, branched alkylamines, cycloalkylamines, alkoxyamines, amino alcohols, cyclic amines containing one nitrogen atom in a ring structure, alkylenediamines, polyetherdiamines, and polyalkylenepolyamines containing 3 to 6 nitrogen atoms.

Preferred amines that are used in mixture with at least one cyclic amine with at least two reactive nitrogen atoms are methylamine, ethylamine, propylamine, ethylenediamine, 1,4-diaminobutane, 1,2-diaminobutane, 1,3-diaminopropane, 1,2-diaminopropane, hexamethylenediamine, bishexamethylenetriamine, diethylenetriamine, dipropylenetriamine, triethylentetramine, tetraethylenepentamine, dimethylaminopropylamine and N,N-bis(3-aminopropyl)-N-methylamine. Most preferred amines that are used in mixture with at least one cyclic amine with at least two reactive nitrogen atoms are ethylenediamine, 1,3-diaminopropane, hexamethylenediamine, dimethylaminopropylamine and N,N-bis(3-aminopropyl)-N-methylamine.

Examples of amino acids which are suitable for use in the dye absorber include glycine, alanine, aspartic acid, glutamic acid, asparagine, glutamine, lysine, arginine, threonine, 2-phenylglycine, 3-aminopropionic acid, 4-aminobutyric acid, 6-aminocaproic acid, 11-aminoundecanoic acid, iminodiacetic acid, sarcosine, 1-carboxymethylpiperazine, 1,4-bis(carboxymethyl)piperazine, 1-carboxymethylimidazole, imidazole carboxylic acid, anthranilic acid, sulfanilic acid, amidosulfonic acid, aminomethylsulfonic acid, aminoethylsulfonic acid, salts thereof, and mixtures thereof.

Other water-soluble polyamines that may be reacted with a suitable cross-linking agent to form the dye absorber include homopolymers, copolymers, and terpolymers of vinyl pyrrolidone; homopolymers, copolymers, and terpolymers of polyvinyl pyridine and its derivatives; homopolymers, copolymers and terpolymers of quaternized polyvinyl pyridine, homopolymers, copolymers and terpolymers of quaternized polyvinyl pyridine carboxylate described in WO 0035880, homopolymers, copolymers, and terpolymers containing the monomer unit

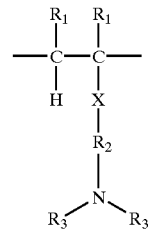

and monomer units from other suitable copolymerizable monoethylenically unsaturated monomers, wherein
  $R_1$ is selected from the group consisting of H, methyl, and mixtures thereof,
  $R_2$ is selected from the group consisting of $C_2$–$C_6$ alkylene, hydroxyalkylene, and mixtures thereof,
  $R_3$ is selected from the group consisting of H, $C_1$–$C_4$ alkyl, $C_7$–$C_9$ alkylaryl, $C_2$–$C_4$ hydroxyalkyl, and mixtures thereof, and
  X is selected from the group consisting of

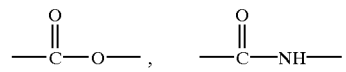

and mixtures thereof. Also suitable are homopolymers, copolymers, and terpolymers comprising the monomer unit

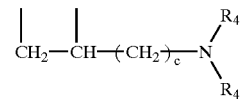

and the monomer units produced from other monoethylenically unsaturated monomers, wherein
  c is one, and
  $R_4$ is selected from the group consisting of H $C_1$–$C_4$ alkyl, hydroxyalkyl, and mixtures thereof; as well as mixtures of any of the above amine polymers.

Suitable cross-linking agents that may be used with these polymers include epihalohydrins, bishalohydrins of diols, bishalohydrins of polyalkylene glycols, bishalohydrins of polytetrahydrofurans, alkylene dihalides, alkylene trihalides, bisepoxides, trisepoxides, tetraepoxides, and mixtures thereof.

Preferred polymers are polyvinyl pyrrolidone, copolymer and terpolymers of vinyl pyrrolidone with monomers selected from vinyl imidazole, acrylic acid, methacrylic acid, C1–C16 alkylmethacrylate, C1–C16 alkyl acrylate, C1–C8 hydroxyalkylacrylate, C1–C8 hydroxyalkylmethacrylate, acrylamide, C1–C16 alkyl acrylamide, C1–C16 dialkylacrylamide, 2-acrylamido-2-methylpropane sulfonic acid or its alkali salt, methacrylamide, C1–C16 alkylmethacrylamide, C1–C16 dialkylmethacrylamide, vinyl formamide, vinylacetamide, vinyl alcohol, C1–C8 vinylalkylether, itaconic acid, vinyl acetate, vinyl propionate, vinyl butyrate, vinyl alcohol, vinyl formamide, vinylamine, vinyl caprolactam, styrene and mixtures thereof.

Most preferred polymers are copolymers of polyvinylpyrrolidone and vinyl imidazole (PVPVI) sold under the trade name Sokolan HP 56, copolymer of vinyl pyrrolidone and sodium methacrylate sold under the trade name Sokolan VPMA both by BASF AG, Ludwigschaefen, Germany, copolymer of vinyl pyrrolidone and alkylamino substituted methacrylate or styrene or acrylic acid, vinyl caprolactam, vinyl acetate, all sold by International Specialty Polymers of Wyane, N.J. PVPVI is usually employed in an amount of about 1 to 50 gsm and more typically about 40 gsm.

Another preferred mixture of polyamines is a combination wherein from about 25 to 100% of the polyamines are homopolymers, copolymers, and terpolymers of the monomer unit:

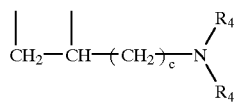

wherein, c is 0 or 1; and $R_4$ is selected from the group consisting of H, $C_1$–$C_4$ alkyl, hydroxyalkyl, and mixtures thereof. Copolymerized with a monomer unit selected from the group consisting of vinyl pyrrolidone, vinyl pyridine-N oxide, acrylic acid, $C_1$–$C_{16}$ alkyl acrylate, methacrylic acid, $C_1$–$C_{16}$ alkylmethacrylate, $C_1$–$C_8$ hydroxyalkylacrylate, $C_1$–$C_8$ hydroxyalkylmethacrylate, acrylamide, $C_1$–$C_{16}$ alkyl acrylamide, $C_1$–$C_{16}$ dialkylacrylamide, methacrylamide, $C_1$–$C_{16}$ alkylmethacrylamide, $C_1$–$C_{16}$ dialkylmethacrylamide, 2-acrylamido-2-methylpropane sulfonic acid, 2-acrylamido-2-methylpropane alkali salt, vinyl formamide, vinylacetamide, vinyl alcohol, $C_1$–$C_8$ vinylalkylether, itaconic acetate, vinyl propionate, vinyl butyrate, and mixtures thereof.

Other polyamines preferred for post-polymerization cross-linking include reactive wet-strength resins described by Kenneth W. Britt in *Wet Strength in Pulp and Paper Chemistry and Chemical Technology*, Vol. III, ed. James Case, John Wiley, 1981, and L. L. Chan in *Wet Strength Resins and their Application*, Tappi Press, 1994. Preferred wet strength polyamidoamine-polyamine epichlorohydrin resins have a molecular weight range from about 300 to about 1,000,000. The amine or amine-epichlorohydrin resins may have one or more functional groups capable of forming azetidinium groups. Furthermore, they may also contain one or more functional epoxide groups. Examples of such resins include those sold under the trade names Kymene® 557H, Kymene® 557LX, Kymene® 450, Kymene® 2064 (Hercules, Inc. Wilmington, Del.), and Luresin® KNU (BASF AG, Germany), mixtures thereof, and quaternized condensates of a polyamine and a cross-linking agent.

Other dye absorbers that can be used are described in U.S. Pat. No. 5,698,476.

In many cases it is desirable to add a detersive surfactant to the coating composition. This surfactant is usually used in an amount of about 1 to about 10 gsm and most typically about 5 gsm. Suitable detersive surfactants are extensively illustrated in U.S. Pat. No. 3,929,678, Dec. 30, 1975 to Laughlin, et al., and U.S. Pat. No. 4,259,217, Mar. 31, 1981 to Murphy; in the series "Surfactant Science", Marcel Dekker, Inc., New York and Basel; in "Handbook of Surfactants", M. R. Porter, Chapman and Hall, $2^{nd}$ Ed., 1994; in "Surfactants in Consumer Products", Ed. J. Falbe, Springer-Verlag, 1987; and in numerous detergent-related patents assigned to Procter & Gamble and other detergent and consumer product manufacturers. The detersive surfactants include anionic, nonionic, cationic, zwitterionic or amphoteric types of surfactant known for use as cleaning agents, but does not include completely foam-free or completely insoluble surfactants (though these may be used as optional adjuncts).

The Particulate Soil Absorber

As used herein, "particulate soil absorber" refers generally to a substance that has a high affinity for extraneous, free-flowing particulate soils and/or clay or particulate soil materials present within an aqueous wash solution. More particularly, a particulate soil absorber is a substance that scavenges soils from the wash solution of a laundering operation and is thus utilized for its properties as a particulate soil pick-up material. The particulate soil absorber comprises a crosslinked polyamide including units having a nucleophilic group. As used herein, "polyamide" refers generally to a polymer which may be natural or synthetic and has amide linkages (—CONH—) along its molecular chain. As used herein, "nucleophilic group" refers generally to a group or moiety that donates a pair of electrons to form a covalent bond. In one embodiment, the nucleophilic group comprises a primary amine functionality. The primary amine functionality acts as a nucleophile and attacks electrophilic regions of the crosslinking agent. As used herein, "crosslinked" and/or "crosslinking" refers generally to a chemical process in which two achains of polymeric molecules are attached by bridges composed of an element, a group or a compound, which join certain carbon atoms of the chains by primary chemical bonds.

Any suitable level of the particulate soil absorber may be adhered to the water-insoluble substrate. As used herein, "adhered" refers generally to a condition wherein the soil absorber is associated and/or attached to the substrate. In one embodiment, the laundry articles comprise from about 0.29 to about 75 weight percent of a particulate soil absorber, based on the total weight of the particulate soil absorber and the water-insoluble substrate. In more specific embodiments, the particulate soil absorber is present in the laundry articles in an amount of from about 2 to about 23 weight percent, more specifically from about 5 to about 17 weight percent. In a specific embodiment, the polyamides are selected from the group consisting of nonionic polyamides and anionic polyamides. In exemplary embodiments, the particulate soil absorber comprises at least one crosslinked polymer containing polymerized units of an N-vinyl-$C_1$–$C_3$-carboxamide and nucleophilic groups and is formed with a crosslinking agent comprising at least two electrophilic groups. More particularly, in specific embodiments, polymers of partially hydrolyzed poly-N-vinyl-$C_1$–$C_3$-carboxamides or copolymers of partially hydrolyzed N-vinyl-$C_1$–$C_3$-carboxamides with other ethylenically unsaturated monomers may be employed. The hydrolyzed units may contain the nucleophilic groups. Poly-N-vinyl-$C_1$–$C_3$-carboxamides may have a degree of hydrolysis of from about 1 to about 90 mol %, more specifically from about 5 to about 75 mol %, even more specifically of from about 10 to about 50 mol %. Examples of such polymers are represented by the following formulas (1)–(3):

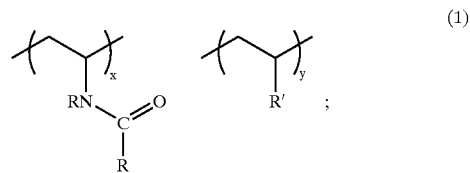

(1)

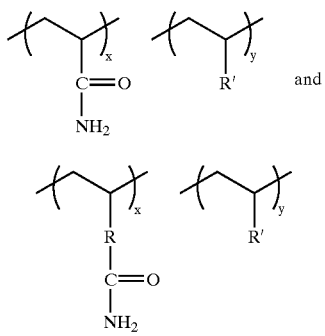

wherein y represents the molar amount of the nucleophilic hydrolyzed unit; each R is selected from the group consisting of: H, $CH_3$, $CH_2CH_3$, $CH_2CH_2CH_3$, $CH_2CH_2CH_2CH_3$, $CH_2OR$, $CH_2CH_2OR$, $CH_2CH_2CH_2OR$; and each R' is a nucleophilic moiety selected from the group consisting of: $-NH_2$; $-RNH_2$; $-NRH$; $-RNRH$; $-CO_2H$; $-RCO_2H$; $-CONH_2$; $-RCONH_2$;

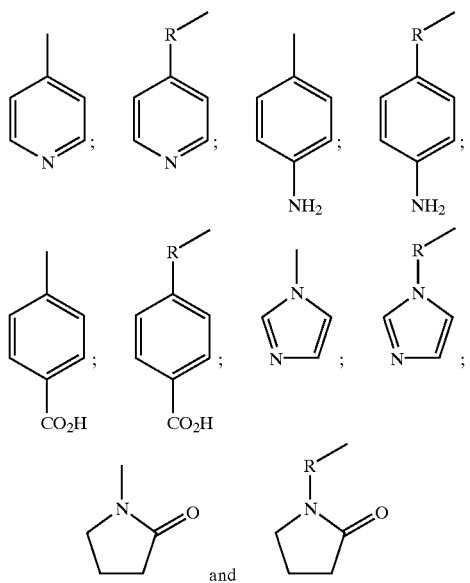

Additionally, the weight average molecular weight of such polymers is from about 10,000 to 5,000,000 D, from about 25,000 to about 1,000,000 D, or from about 40,000 to about 500,000 D.

In a more specific embodiment according to the present invention, the particulate soil absorber comprises a partially hydrolyzed poly-N-vinylformamide of the formula:

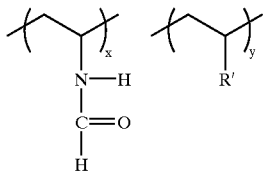

wherein x, y and R' are defined as described above. Suitable monomers for preparing such polymers include, but are not limited to, N-vinylformamide, N-vinyl-N-methylformamide, N-vinylacetamide, N-vinyl-N-methylacetamide, N-vinylpropionamide and N-vinyl-N-methylpropionamide. The monomers can be polymerized alone, in mixtures with one another, or together with one or more additional monoethylenically unsaturated monomers. The partially hydrolyzed polymers and copolymers may be formed by hydrolyzing a poly-N-vinyl-$C_1$–$C_3$-carboxamide polymer or copolymer using any conventional hydrolysis reaction known in the art to provide the desired nucleophilic R' group. In one embodiment, copolymers of the present invention may be formed by the polymerization of: a) 40 to 99% by weight of at least one N-vinyl-$C_1$–$C_3$-carboxamide; b) 1 to 60% of comonomers containing at least one nucleophilic group; c) 0 to 60% by weight of a modifying copolymerizable monoethylenically unsaturated nonionic or cationic monomer; d) 0 to 20% by weight of other modifying monoethylenically unsaturated monomers such as, but not limited to, carboxylic acids, sulfonic acids and phosphonic acids, the alkali metal salts and the anhydrides thereof; and e) 0 to 5% by weight of polyethylenically unsaturated monomers.

Suitable comonomers (b) containing at least one nucleophilic group comprise N-vinylimidazole, N-vinyl-2-methylimidazole, N-vinyl-4-methyl-imidazole, N-vinyl-5-methylimidazole, and esters of ethylenically unsaturated carboxylic acids with dialkylaminoalkylalcohols, such as dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, dimethylaminobutyl acrylate and diethylaminobutyl acrylate. Other suitable comonomers (b) include amides of ethylenically unsaturated carboxylic acids with dialkylaminoalkylamines, such as, dimethylaminoethyl acrylamide, dimethylaminoethyl methacrylamide, diethylaminoethyl acrylamide, diethylaminoethyl methacrylamide, dimethylaminopropyl acrylamide, dimethylaminopropyl methacrylamide, diethylaminopropyl acrylamide, dimethylaminobutyl acrylamide and diethylaminobutyl acrylamide.

It has been determined that vinylimidazoles, basic acrylates and basic acrylamides can be used in the form of free bases, salts with mineral acids, such as hydrochloric acid, sulfuric acid or nitric acid, and salts with organic acids, such as formic acid, acetic acid, propionic acid or sulfonic acids.

Suitable monoethylenically unsaturated monomers (c) include all other monoethylenically unsaturated nonionic or cationic monomers. Examples of such include, vinyl esters of saturated $C_1$–$C_6$-carboxylic acids, such as vinyl formate, vinyl acetate, vinyl propionate and vinyl butyrate, and vinyl ethers, such as $C_1$–$C_6$-alkyl vinyl ethers, such as methyl vinyl ether and ethyl vinyl ether, esters, amides and nitriles of monoethylenically unsaturated $C_3$–$C_6$-carboxylic acids, such as esters, amides and nitriles of acrylic acid, methacrylic acid, maleic acid, crotonic acid, itaconic acid and vinyl acetic acid, such as methyl acrylate, methyl methacrylate, ethyl acrylate and ethyl methacrylate, n-butylacrylate, t-butylacrylate, 2-ethylhexylacrylate, laurylacrylate, acrylamide, methacrylamide, N-methylacrylamide, N-isopropylacrylamide, N-octylacrylamide, N-vinylpyrrolidone, N-vinylcaprolactam, N-vinyloxazolidine, acrylonitrile and methacrylonitrile.

Additional monoethylenically unsaturated monomers (c) include esters of monoethylenically unsaturated $C_3$–$C_6$-carboxylic acids which are derived from glycols of polyalkylene glycols and wherein only one hydroxyl group is esterified. Suitable examples include hydroxyethyl acrylate, hydroxypropyl acrylate, hydroxybutyl acrylate, hydroxyethyl methacrylate, hydroxypropyl methacrylate, hydroxybutyl methacrylate and acrylic monoesters of polyalkylene glycols having a molar mass of from about 500 to about 10,000 D, N-vinylpyrrolidone, N-vinylcaprolactame, N-vinyloxazolidine, styrene, ethylene, propylene, butylene, isobutylene, diisobutene and butadiene. Additional monoethylenically unsaturated cationic comonomers (c) include the quaternized derivatives of monomers (b) wherein quaternization is done with $C_1$–$C_{18}$-alkylating agents, such as $C_1$–$C_{18}$-alkylhalogenides, $C_1$- or $C_2$-dialkylsulfates or benzylhalogenides and diallyldialkylammonium halides, such as diallyldimethylammonium chloride.

Suitable anionic monoethylenically unsaturated monomers (d) include monoethylenically unsaturated $C_3$–$C_6$-carboxylic acids, such as acrylic acid, methacrylic acid, maleic acid, crotonic acid, itaconic acid and vinyl acetic acid; monoethylenically unsaturated sulfonic acids, such as vinylsulfonic acid and acrylamidopropanesulfonic acid; and monoethylenically unsaturated phosphonic acids such as vinylphosphonic acid and the alkali metal salts thereof. Suitable polyethylenically unsaturated monomers (e) are monomers which contain at least 2 monoethylenically unsaturated, non-conjugated double bonds and are usually used as crosslinking agents for polymerization reactions, such as acrylic esters, methacrylic esters, allyl ethers and vinyl ethers of at least dihydric alcohols, such as the diacrylates or dimethacrylates of $C_2$–$C_6$-diols, polyethylene glycols with 2–15 ethylene glycol units, and polypropylene glycols with 2–5 propylene glycol units. Other suitable monomers (e) include di(acrylic amides) or di(methacrylic) amides of $C_2$–$C_8$-diamines, methylenebisacrylamide, N,N'-divinylurea or divinylstyrene.

In another exemplary embodiment, the particulate soil absorbers comprise at least one crosslinked polymer containing polymerized units of an N-vinyl-$C_1$–$C_3$-carboxamide formed by reacting a polymer containing an electrophilic group with a crosslinking agent containing at least two nucleophilic groups.

In a more specific embodiment, polymers containing electrophilic groups according to the present invention comprise a copolymer of N-vinyl-$C_1$–$C_3$-carboxamide which is formed by the polymerization of: a) about 40 to 99.5% by weight of N-vinyl-$C_1$–$C_3$-carboxamide; b) about 0.5 to 50% by weight of an ester of a monoethylenically unsaturated carboxylic acid with $C_1$–$C_4$-alcohols or about 0.5 to 20% by weight of an anhydride of a monoethylenically unsaturated dicarboxylic acid; c) about 0 to 60% by weight of other copolymerizable nonionic or cationic monoethylenically unsaturated monomers; and d) about 0 to 20% by weight of other copolymerizable anionic monoethylenically unsaturated monomers. Suitable crosslinking agents are polyamines with at least two primary, secondary or tertiary amino groups.

The typical molar mass molecular weight ($M_w$) of the above polymers which contain electrophilic groups is from about 10,000 to about 5,000,000 D, from about 25,000 to about 1,000,000 D or from about 40,000 to about 500,000 D.

In a specific embodiment according to the present invention, the particulate soil absorber comprises a crosslinking agent selected from the group consisting of epihalohydrins, polyhalohydrins, bishalohydrins, alkylene dihalides, alkylene trihalides, bisepoxides, trisepoxides, tetraepoxides and mixtures thereof. In another specific embodiment the particulate soil absorber comprises a crosslinking agent selected from the group consisting of epichlorohydrins, polychlorohydrins, bishalohydrins of polyalkylene diols, bishalohydrins of polyalkylene glycols, bishalohydrins of polytetrahydrofurans, polyisocyanates, polyamidoamine/epichlorohydrine resins, amine-aldehyde resins, polyglycidylethers, poly(meth)acrylesters and mixtures thereof. In still other embodiments, the particulate soil absorber comprises a crosslinking agent selected from the group consisting of polyamide-epichlorohydrins, trimethylolpropane tris-glycidyl ethers, poly(meth)acrylesters of polyhydroxy compounds, water-soluble polyamidoamine/epichlorohydrin resins, water-soluble polyglycidylethers, polychlorohydrins of alkoxylated polyols and mixtures thereof.

In forming the laundry articles of the present invention, the polymer and the crosslinking agent are used in such a ratio that an effective crosslinking reaction takes place on the surface of the water-insoluble substrate. Typically, the amount of crosslinking agent used, based on the weight of the polymer, is from about 1 to about 300% by weight, from about 5 to about 150% by weight, or from about 10 to about 100% by weight.

The Dye Transfer Inhibitor

An optional, but preferred ingredient in the current invention is a dye transfer inhibitor in addition to the dye absorber. Dye transfer inhibitors are generally well known in the art, and any known are suitable for use with the present invention. Generally dye absorbers are soluble materials; according to the present invention, the dye transfer inhibitor would be releasable associated with the insoluble substrate. Dye transfer inhibitors would be introduced to the wash solution via the insoluble substrate, solubilize or otherwise dissociate from the insoluble substrate, and flow freely throughout the wash solution. Dye transfer inhibitors interact with fugitive dyes by binding or oxidizing them, and prevent redeposition of fugitive dyes on articles and/or garments. The dye transfer inhibitor is not an essential component of the current invention, but is desirable, to ensure thorough capture of fugitive dyes in a wash solution. The dye transfer inhibitor may, but does not necessarily have to be comprised of the same material as the dye absorber.

Many different materials can be used as dye transfer inhibitors, including, but not limited to polymers; enzymes; bleaches, alone or with bleaching aids and/or bleaching activators; inclusion compounds; minerals; nonionic and conventional aqueous thickeners; systems comprising combinations of those listed, and combinations thereof.

Some examples of polymers that have been used as dye transfer inhibitors include: homopolymers, copolymers and terpolymers of vinyl pyrrolidone, vinyl imidazole for example those described in U.S. Pat. No. 5,627,151, polyamine-N-oxides (PVNO), homopolymers, copolymers and terpolymers of polyvinyl pyridine and its derivatives, especially quaternized polyvinyl pyridine carboxylate described in WO 99/15614 and WO 00/35880, acrylamide containing polymers, aqueous thickeners, aryl sulfonic acid condensates, as for example those described in EP 634,486, vinyl amide polymers such as those described in EP 753, 566, polymers containing =N—C(=O) group described in WO 98/49259; dendritic macromolecules such as those described in EP 779,358; cationic starches; copolymers of cationic starches; hydrophobicly modified PVP; polyethylene imines and its derivatives such as those described in WO 97/42286; polyvinyl oxazolidone; propylene oxide reaction products; poly(amino acids), specifically, polyaspartic acid and polyhistadine; block copolymers of alkylene oxides, for example, those of the trade name Pluronic® (BASF); polyamines, polyamides, methyl cellulose, carboxyalkyl cellulose; guar gum; natural gums; polycarboxylic acids; alginic acid; copolymers of proteins; copolymers of hydrolyzed proteins; colloids; hydrophobicly derivatized cellulose derived colloids; polymer coated colloids; and poly-4-vinylpyridine-N-oxide (PVNO), quaternized polyvinyl pyridine carboxylate for example sold under the trade name Chromabond (International Specialty Products), condensates of polyamine and cyano or guanidine containing compound as described in U.S. Pat. No. 6,008,316. PVNO may be used in an amount of about 1 to about 10 gsm.

Bleaches have also been used as dye transfer inhibitors. Some examples of bleaches and bleaching systems useful as dye transfer inhibitors include: halogen bleaching agents; organic peroxy acids, such as percarboxylic acid; perborates; persulfates; percarbonates; peroxydisulfates; perphosphates; $H_2O_2$ generating enzymes; $H_2O_2$ generating systems, such as a combination of a metallo bleach catalyst, an amine base catalyst stabilizer, and an enzyme; as well as other known bleaching agents.

Enzymes and enzyme systems have also been employed as dye transfer inhibitors. Some non-limiting examples of enzymes and enzyme systems include: enzyme oxidants; catechol oxidase; laccase; systems comprising an enzyme which exhibits peroxidase activity, an $H_2O_2$ source, and an accelerator such as phenothiazine or phenoxazine; systems comprising a metallo bleach catalyst, an amine base catalyst stabilizer, and an enzyme capable of generating $H_2O_2$; and enzymatic systems including peroxidases and oxidases.

Other materials that have are useful dye transfer inhibitors also include cationic and amphoteric surfactants; cyclodextrins and other inclusion compounds; minerals, such as magnesium aluminate and hydrotalcite; bleaching activators, such as tetraacetylethylenediamine; nonanoyloxybenzenesulfonate, 3,3,5-trimethylhexanoyloxybenzenesulfonate, pentaacetylglucose, and acylated citrate esters; and nonionic and conventional thickeners, such as polyethoxylated urethanes, and acrylamide containing polymers. Other dye transfer inhibitors useful herein are disclosed in U.S. Pat. No. 5,698,476.

This list is not intended to be all-inclusive of dye transfer inhibitors that may be used, and is not meant to limit the invention. The dye transfer inhibitor used as part of the current invention may comprise any single dye transfer inhibitor or any combination of two or more dye transfer inhibitors. The amount of dye transfer used per laundry additive article will depend on the scavenging efficiency of the chosen material. One of ordinary skill in the art would be able to select an effective amount based on the identity of the dye transfer absorber chosen. The amount of dye transfer inhibitor is generally expected to fall within the range of about 0.01 g to about 5 g per laundry additive article.

The Substrate

The insoluble substrate is the vehicle by which the dye or particulate soil absorber and any other optional components, including the dye transfer inhibitor are introduced into the wash solution. As described above, the preferred method of adhering the dye or particulate soil absorber physically to the substrate is by cross-linking the dye or particulate soil absorber to form a three-dimensional network around the substrate web. Unlike dye absorbing systems using cationics, the current invention does not require that the substrate have any specific chemical functionalities. Substrates with no reactive functional groups can be used with the current invention. Furthermore, substrates can be used as made or received without performing any additional steps, such as surface modification.

The substrate may be virtually any material that is insoluble in standard aqueous wash conditions. Several suitable materials are known in the art. A non-limiting list of these materials includes cellulosic materials, such as wood pulp, rayon, and cotton, in both woven and non-woven forms; and synthetic polymeric materials such as polyester, polyethylene, polypropylene, and polyurethane.

The most preferred substrate for this invention is tissue paper, with a weight of about 40 grams per square meter (gsm), made with northern softwood Kraft pulp. The second most preferred substrate is approximately 60 gsm hydroentangled wet laid nonwoven, sold under the trade name Hydraspun® (Dexter Corp., Windsor Locks, Conn.). The third most preferred substrate is approximately 100 gsm air-laid nonwoven substrate material comprised of 72% wood pulp, 25% bicomponent fibers, and 3% latex, sold under the trade name Visorb (Buckeye Technologies, Memphis, Tenn.).

The substrate can be any color, though a lighter color is preferred so that dyes and particulate soil collected by the dye or particulate soil absorber during the wash cycle can be seen by the consumer. The substrate comprises one layer or multiple layers made of combinations of materials with the desired properties. The substrate may be water permeable to let the wash solution pass through to enhance absorption of fugitive dyes by the dye or particulate soil absorber.

Since almost any water-insoluble material may be used as the substrate, some further considerations may include durability, handfeel, processability, and cost. Other desirable characteristics may also include that the substrate preferably will not lint, fall apart, or ball up. Furthermore, the substrate should be heat resistant up to temperatures employed in typical wash conditions in the US and Europe, and should be able to stand up to drying in a conventional clothes dryer without any ill effects.

In order to give the article sufficient physical strength to prevent it from folding during the wash cycle, it is advantageous to manufacture the article as a multi-layer dye absorbing article. Articles having this construction are disclosed in copending application Ser. No. 09/973,440 filed Oct. 13, 2001.

Turning now to FIG. 1, a multi-layer dye-scavenging article 11 comprises first layer 10, second layer 12, each layer having first and second surfaces 14, 16, 18 and 20 respectively. As will be understood, layer thicknesses have been exaggerated and are not to scale to aid in clearly depicting all of the layers in the article. The multi-layer dye-scavenging article 11 comprises a first layer 10 having first and second surfaces 14 and 16. First surface 14 is preferably directly exposed to the wash solution and the articles and/or garments being laundered. Second surface 16 preferably faces first surface 18 of second layer 12. First layer 10 preferably has a basis weight of from about 10 gsm to about 200 gsm, more preferably from about 20 gsm to about 100 gsm, and most preferably from about 20 gsm to about 50 gsm. A basis weight of from about 10 gsm to about 200 gsm produces a layer with comfortable consumer aesthetics and adequate strength such that it maintains its structural integrity throughout the wash cycle. Additionally, having a basis weight from about 10 gsm to about 200 gsm, also provides satisfactory hand feel to the consumer.

It is additionally preferred that the first layer 10 have an opacity of less than about 70%, preferably less than about 50%. Where first layer 10 has an opacity of less than about 70% the consumer can see through first layer 10 to second layer 12 and view the dye absorbed from the wash solution on the second layer 12 of the article thereby providing a visual signal that fugitive dye is being absorbed. It is further preferred that first layer 10 has a water permeability of at least 0.06 ml/sec/cm$^2$ to assure sufficient water is permitted to flow through first layer 10 and contact the dye absorbing and/or other detergent active material fixed to at least one other layer.

If it is desired that the dye-scavenging article be compatible for use in machine drying appliances then it is further preferred that first layer 10 have a melting point of greater than or equal to about 100° C., preferably greater than or equal to about 130° C.

The multi-layer dye-scavenging article 11 further comprises a second layer 12. The second layer 12 has first and second surfaces 18 and 20. The second layer 12 has a basis weight of from about 30 gsm to about 200 gsm, preferably from about 60 gsm to about 150 gsm, and most preferably from about 80 gsm to about 120 gsm. Second layer 12 also preferably has a water permeability of at least about 0.06 ml/sec/cm$^2$, preferably 0.1 ml/sec/cm$^2$. Additionally, if it is desired that the dye-scavenging article be compatible for use in machine drying appliances then it is further preferred that second layer 12 have a melting point of greater than or equal to 100° C., preferably greater than or equal to 130° C.

In a particular embodiment of the present invention, second layer 12 has a Taber stiffness rating of at least about 7 Taber Stiffness Units (TSU), preferably from about 10 TSU to about 200 TSU, and more preferably from about 10 TSU to about 100 TSU. When second layer 12 has the aforementioned stiffness rating, the resulting article has sufficient physical strength and rigidity such that it does not fold during the wash cycle, which can greatly reduce efficacy. The stiffness rating is preferably determined after any dye absorbing, dye transfer inhibiting or other detergent active material is fixed to the layer.

Dye adsorption and/or dye transfer inhibiting compounds are preferably fixed to second layer 12, however one of skill in the art will recognize that these compounds may be fixed to any layer. While this may be accomplished via any method, a preferred method includes liquefying the compounds and coating the first and second surfaces, 18 and 20 of second layer 12. Thereafter, the compounds are allowed to harden around the fibers of the second layer 12. When the multi-layer dye-scavenging article 11 comprises only a first layer 10 and a second layer 12, the dye absorbents or other detergent actives are preferably applied to the first surface 18 of the second layer 12.

In an optional embodiment of the present invention, multi-layer dye-scavenging article 11 may further comprise any number of additional layers. An especially preferred embodiment of the present invention represented by FIG. 2 shows a multi-layer dye scavenging article 11 having a first layer 22, a second layer 24 and a third layer 26. The first layer 22, has first and second surfaces 28 and 30 respectively. The second layer 24 has first and second surfaces 32 and 34 respectively. The third layer 26 has first and second surfaces 36 and 38 respectively. When additional layers are present the dye absorbents and/or other detergent active materials are preferably applied to both the first surface 32 and the second surface 34 of second layer 26. Of course one of ordinary skill in the art will recognize that placement of dye absorbents and/or other detergent active materials on any layer is consistent with the present invention. A multi-layer dye-scavenging article with several layers may be provided, which have distributed between them several detergent actives. By providing an article with several layers one can deliver detergent active materials in the same product, which would otherwise be incompatible with each other by separating them by at least one layer. Suitable materials for all layers are described in detail below.

When present additional layers preferably have a basis weight of from about 10 gsm to about 200 gsm, more preferably from about 20 gsm to about 100 gsm, and most preferably from about 20 gsm to about 50 gsm. It is additionally preferred that additional layers have an opacity of less than about 70%, preferably less than about 50%. It is further preferred that additional layers have a water permeability of at least 0.06 ml/sec/cm$^2$, more preferably at least about 0.1 ml/sec/cm$^2$. If it is desired that the dye-scavenging article be compatible for use in machine drying appliances then it is further preferred that additional layers have a melting point of greater than or equal to about 100° C, preferably greater than or equal to about 130° C.

Turning now to FIG. 3 a top view of a multi-layer dye-scavenging article according to the present invention is shown. The multi-layer dye-scavenging article 11 is shown with first surface 14 of first layer 10 illustrated. Individual means for coupling 40 are placed evenly or randomly throughout the article to couple one layer to the next layer. Optionally, there is a continuous means for coupling 42 along the perimeter of the article. The couplings prevent the layers from substantially separating from each other during the wash cycle and reducing efficacy of the actives. Coupling may be achieved by any means known in the art, including but not limited to pressure bonding, adhesive bonding, sonic bonding etc. One of ordinary skill in the art will recognize that the pattern or placement of the couplings is not critical as long as they adequately prevent separation of the layers. Accordingly, various patterns or designs and any combination thereof are contemplated by the present invention.

The Signal

Optionally, a signal may be incorporated into the laundry additive article of the current invention. The signal would offer visual evidence to the consumer that there were extraneous dyes released into the wash solution and that those extraneous dyes were absorbed by the article. The color change of the signal may be a result of any of several different mechanisms, including but not limited to, absorption or adsorption of dyes and particulate soil, binding with, or otherwise tying up dyes and particulate soil on the article.

In a preferred form, the article will have some areas that do not have dye or particulate soil absorber. In these areas with no dye or particulate soil absorber, the color of the article will remain unchanged through the wash cycle, while the areas with dye or particulate soil absorber will change as dyes and particulate soil are absorbed. This will provide a greater contrast for the signal than if the entire area is covered with dye or particulate soil absorber.

Optional Ingredients

While the central feature of the current invention is to provide a laundry additive article that selectively and effective absorbs fugitive dyes from solution and further prevents those dyes from redepositing onto other fabrics in a wash solution, the wash additive article of the current invention may also comprise a number of other optional ingredients. These ingredients may add any desirable quality to the article, including, but not limited to enhancing wash properties, providing fabric softening, and serving aesthetic purposes.

A non-limiting list of optional ingredients includes detergents; detergent adjuncts; anionic, cationic, nonionic, zwitterionic, and amphoteric surfactants; soil release agents, including, but not limited to copolymers or terpolymers of terephthalic acid with ethylene and/or propylene glycol; soil suspension agents; chelants; bactericides; tarnish inhibitors; suds suppressers; and anti-redeposition agents. Other desirable optional additives may include optical brighteners; coloring agents; dyes; and pigments. Fabric softeners may also be added. These may be chosen from any known in the art, including, but not limited to inorganic types, including smectite clays, montmorillonite clays, and hectorite clays; and organic types, such as water insoluble tertiary amines, water insoluble tertiary amines combined with mono- quaternary ammonium salts, and water insoluble tertiary amines combined with di-long-chain amides. Perfumes may be added as well.

In one embodiment, the optional additive is formulated as a waxy or hot melt coating composition prepared by dispersing the additive into a meltable binder which adheres the additive to the substrate when it cools. This mode of addition may be required where the additive cannot be applied to the substrate upstream of the ovens.

In summary some typical coating constituents and the approximate amounts in which they are used are provided in the following table:

| | |
|---|---|
| PAE Resin | 1 to 30 gsm |
| PVPVI | 1 to 50 gsm |
| PVNO | 1 to 10 gsm |
| PVFA | 1 to 20 gsm |
| PB Base | 1 to 50 gsm |
| Imidazole-epichlorohydrin oligomer | 1 to 20 gsm |
| Surfactant | 1 to 10 gsm |

Method of Use

The laundry additive article of the current invention is meant to be used as part of a regular laundering routine. The article is added to a home or commercial washing machine along with the detergent, clothes and other fabric items to be washed, and any other additives, such as fabric softeners, which may be added. During the wash cycle, the article will release the dye transfer inhibitor into the wash solution, if included, and retain the insoluble polyamine dye absorber. The article will move freely around the wash solution, coming into contact with fugitive dyes, absorbing them, and retaining them on the article permanently. The article will also be able to capture any dyes released during the rinse cycle, after a dye transfer inhibitor would be rinsed away. Upon completion of the entire wash cycle, the article may be removed and disposed of, or may be placed in the clothes dryer with the other fabrics from the washing machine.

The efficient, selective dye-absorbing article of the present invention has several advantages over the prior art. The unique dye absorbing system that it employs is selective to dyes, unlike the dye absorbers of the prior art. The cationic dye absorbers of the prior art did adsorb some fugitive dyes, but absorbed even more anionic surfactant from the detergent. The result was lower detergent efficiency and lower dye absorber efficiency. Furthermore, cationic dye absorbers could not be made completely insoluble. Any soluble cationic dye absorber would bind to fabrics, adsorb fugitive dyes and fix them permanently to the fabrics. With the current invention, slight insolubility is not a problem because the non-cationic dye absorbers used act as dye transfer inhibitors when solubilized. They do not bind to clothes, still bind fugitive dyes, and are rinsed away at the end of the wash cycle.

Processes and Methods of Manufacture

Web Handling: The present invention will not address the specifics of web handling which relates to the unit operations and equipment used to handle rolled goods, specifically webs used in this application. Techniques for handling webs are common in the industry and may consist of an unwind, drives, rollers, nips, transportation belts, web directing equipment, spreaders, slitters, rewinds, and festooning equipment. Specifically in this application, web handling encompasses handling a roll of non-woven web, mounting on an unwinder and conveying it through the unit operations it encounters through the methods of manufacture.

Chemical Deposition and coating of the Web: In the present invention, chemical deposition onto a web refers to the application of a liquid to a traveling web or substrate, also known as coating. Representative coating processes are discussed, for example, in Kirk-Othmer Encyclopedia of Chemical Technology $3^{rd}$ Ed., vol. 6, pp. 386–426 under Coating Processes. The coater arrangement may be based on one or a combination of for example brush coating, knife coating, supported Rod coating, gravure coating, meniscus coating, kiss-roll coating, size press coating, transfer roll coating, gravure coating or printing, transfer printing, reverse roll coating, saturation web impregnation, calender coating, cast coating, dip coating, spray coating, electrostatic coating, polymerization coating formed in situ, extrusion coating, curtain coating, etc.

In this application all coating systems typically include application and metering devices. One desirable metering device is a positive displacement pump suitable for handling the rheology of the liquids as well as metering within specified tolerances. The preferred application device depends on the type of coating process itself. For example brush coating machines apply the coating by a rotating cylindrical or roller brush and then leveled and spread by transverse oscillating brushes. A preferred application device for the materials used in this application is a slot die coater for highly viscous materials such as liquids, hot melts, and liquid-powder combinations. A slot die coater is particularly useful in this invention for the ability to consistently provide reliable intermittent or continuous patterned coating across the width of the web of the particulate soil or dye absorber polymers for example. In addition, a heated slot die coater is best used for controlled temperature delivery of the material being used. A combination of two or more slot die coaters placed downstream of one another can deliver a continuous or intermittent pattern of various liquid streams to the web. Another preferred application device is a spray nozzle for less viscous materials such as the cross-linking agent.

Drying and/or Curing: The coated web is transported through a heating chamber such as a drying oven. The temperature at which these ovens operate serves at least two purposes: the removal of inert solvents used to suspend, dissolve, or disperse the active ingredients of the coating such as the particulate soil and dye polymers and the curing of the cross-linking reaction taking place on the web between the particulate soil and dye polymers and the cross-linking agent. The desired moisture content of the web and the materials it caries in this invention can be adjusted to levels adequate for the intended application by drying for example in a conventional web drying equipment such as a forced convection oven. Representative examples of oven and oven conditions are discussed for example in "Handbook of Industrial Drying" by A. J. Mujumdar, $2^{nd}$ Edition, 1995. In any oven, the drying temperature should not adversely affect the coating formulation and the web temperature itself should not exceed the auto-ignition temperature of the cellulose component during drying. Although drying may be done in a conventional web drying oven, one could use combination of conventional equipment such as a forced convection oven and a drum dryer. In addition one should not lose site of other available technologies such as high frequency dielectric heating, Infra red, and pulse combustion and combinations thereof. Also it may be advantageous to dry the web in an oven followed by a curing step using an electron beam or UV radiation.

Specifically in this application, the final moisture content of the web and its contents must be maintained below levels at which the coated web can be stored and transported in bulk as rolled goods or festooned. The exact moisture depends on the composition of the materials deposited on the web but is typically below 10% free moisture (i.e. water not associated to any crystalline species) and most typically below 7%.

Figure 4:
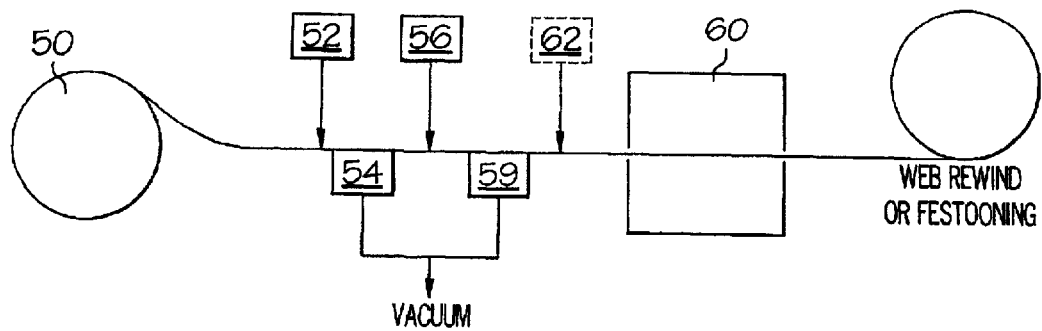
FIG. 4. is a schematic illustration of one process for manufacturing a dye-scavenging laundry article in accordance with the present invention.

Manufacturing Method:

FIG. 4 is a schematic illustration of a manufacturing process for the laundry article in accordance with the invention. A web 50 of an insoluble substrate such as absorbent material like tissue paper or paper toweling (4 gsm) is paid out from an unwind roll and conveyed by means of conventional web handling equipment in a manner well known in the art to the other manufacturing stations. As indicated above, the specifics of the web handling equipment will not be addressed in this application. Web handling techniques and equipment are well known in the art.

At a first coating station 52, a coating composition containing the dye or particulate soil absorber is applied to the surface of the web. The dye or particulate soil absorber may be applied as a coating composition of a polymer, a prepolymer, an oligomer, or as a monomer composition that is polymerized in situ (with appropriate initiators). In this sense, the coating composition of the dye or particulate soil absorber is referred to herein as being polymerizable or crosslinkable. At coating station 52, the coater is preferably a slot die coater. This coater is preferred because an aqueous based polymeric coating composition tends to be relatively viscous. Using a slot die coater enables the composition to be heated and readily metered to the web using, for example, the slot die coater may be used in combination with a positive displacement pump for this purpose.

The concentration of dye or particulate soil absorber ranges preferably from about 5–85% solids, more preferably from about 10 to 75% solids and most preferably from about 15 to 65% solids. The coating of the dye or particulate soil absorber is typically applied to the web on a dry basis in an amount of preferably less than 100 gsm more preferably less than 75 gsm and most preferably less than 50 gsm. The dye or particulate soil absorber is applied at least in an amount that is effective for the purpose. Typically, it will be applied in an amount of about 1 to about 50 gsm. The operating parameters for slot dies can be readily adjusted to provide the desired coat weight. The coating can be applied onto the web either continuously or intermittently and in patterns readily known in the art. The concentration of the coating composition will be selected based on the density (grams per square meter) of the web, its caliper, and its ability to absorb and retain fluid along with the amount of dye or particulate soil absorber to be deposited on the web, the viscosity of the composition and how readily the water can be removed upon passing the coated web through the oven. As the viscosity of the composition increases, additional drying time may be required although the amount of water in the composition is actually less. Typically the dye absorbing composition contains up to about 60% solids and more typically up to about 35% solids. At concentrations above this, the coating composition becomes inconvenient to coat. The coating applied at the first station is preferably a solution of PVPVI containing about 15 to 40% solids in water. In order to maintain the viscosity of the coating at a level at which it can be readily applied to the web in the amounts desired the coating composition may be pre-heated to a temperature of about 40 to 80° C.

Downstream from coating station 52, a vacuum port 54 is optionally provided. The function of the vacuum port is to draw the viscous coating composition of the polymeric amine dye or particulate soil absorber into and optionally through the web. The strength of the vacuum applied to the backside of the web can be readily adjusted in order to achieve the desired degree of web penetration. In accordance with the embodiment illustrated in FIG. 4, a second coating station 56 is located downstream of the vacuum port 54. A coating composition of the cross-linker is applied to the coated dye-absorber at coating station 56. Coating station 56 is also preferably a slot die coater but spray coating is also useful. The cross-linker is preferably PAE resin. The cross-linker is applied in an amount based upon the amount of the dye or particulate soil absorber so as to effectively cross-link the dye or particulate soil absorber and thereby insure its retention on the web during washing. The composition of the cross-linker typically has a concentration up to about 40% solids and more typically about 15 to about 40% solids (alternatively, in some cases the cross-linker may be applied neat) and the coating is applied on a dry basis in an amount preferably less than 100 gsm more preferably less than 75 gsm and most preferably less than 50 gsm. The cross-linker is applied at least in an amount sufficient to cross-link the dye or particulate soil absorber and prevent its removal from the substrate during the wash cycle. After the application of the cross-linker, the coating is preferably subjected to an additional back-side vacuum treatment at vacuum port 59. It will be recognized that while it has been found desirable to use a combination of two vacuum ports, the second port 59 could be used without the first.

The web coated with the dye or particulate soil absorber and the cross-linker is conveyed to an oven 60 in which the web is heated to a temperature that dries the web and the cross-linker reacts with the dye-absorber. The oven 60 can be any conventional oven designed for this purpose such as a forced air, infrared, microwave or pulse combustion oven. In accordance with one embodiment of the invention, the residence time of the web in the oven is preferably less than 15 minutes, more preferably less than 10 minutes and most preferably less than 5 minutes and depending on the type of oven used and the residence time in the oven, the oven is operated at a temperature most suitable for drying without charring or igniting the web. The web is usually dried to a moisture content most preferably below 10% and typically about 7 to 10%. Multiple ovens can be used in series or a combination of ovens and drum dryers suitable for drying cellulose based webs may be used. The web is typically conveyed through the coating and drying operations at a web speed preferably faster than 1 m/min, more preferably faster than 10 m/min and more preferably faster than 30 m/min. The methods described herein can be used to deliver to the web, on a dry basis, about 0.1 to 3 times the weight of the web expressed as gsm.

While the invention has been illustrated using a slot die coater, other coating operations can be used including brush coating, knife coating, fibrous belt coating, metering rod coating, blade coating, supported rod coating, meniscus coating, kiss-roll coating, size press coating, transfer roll coating, gravure coating, transfer printing, reverse roll coating, saturated web impregnation, calendar coating, cast coating, dip coating, spray coating, curtain coating, extrusion coating, etc.

Figure 7:
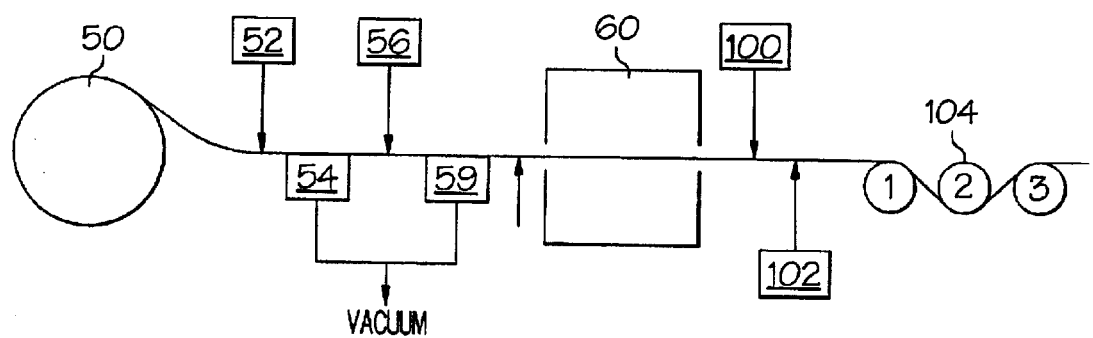
FIG. 7. is a schematic illustration of another process for manufacturing a dye-scavenging laundry article in accordance with the present invention wherein a hot melt composition is applied to the substrate and chill rolls are used to solidify the composition on the substrate.

The method of the present invention can be modified to include the addition of any of the Optional Ingredients described earlier herein to enhance wash properties, serve aesthetic purposes and the like. For this purpose, an additional optional coating station 62 is shown with phantom lines in FIG. 4. As an alternative to locating the optional coating station 62 as shown in FIG. 4, those skilled in the art will appreciate that this coating station can be located on either side of the web depending on the nature and purpose of the additive and/or it may be located downstream from the oven. In this case if the additive requires drying, additional dryers can be used in a conventional manner. FIG. 7 illustrates an embodiment of the invention in which the optional additive is waxy or is applied to the substrate as a hot melt composition. In this embodiment the hot melt composition can be applied to the web 50 downstream of the oven 60 at a coating station 100. Station 100 can employ any of the coaters conventionally used to apply hot melt compositions including heated roll coaters or knife and roll coaters. The coating can be applied to either side of the substrate 50. Coating station 102 illustrates application of the coating to the back side of the substrate. The hot melt coating composition is set by passing the coated web 50 over one or more chill rolls 104. The chill rolls reduce the temperature of the substrate to a temperature at which the coating composition solidifies.

Figure 5:
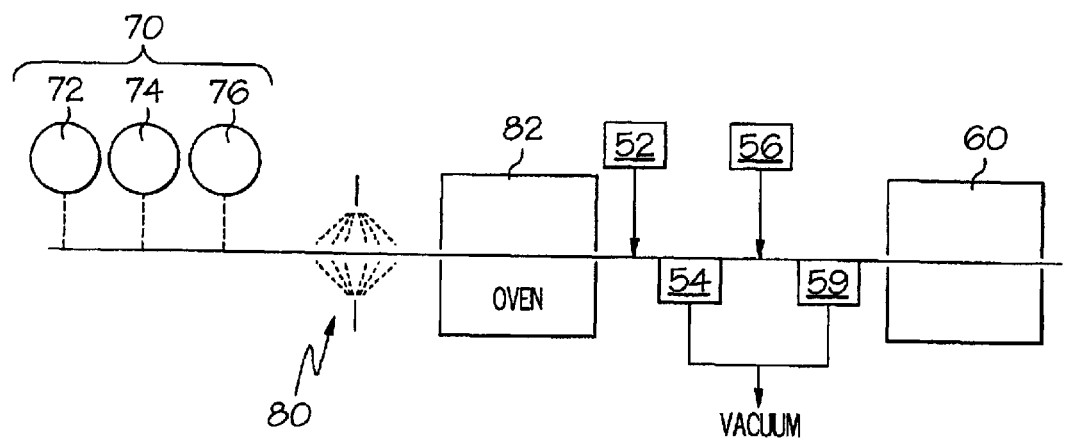
FIG. 5. is a schematic illustration of one process for manufacturing a dye-scavenging laundry article in accordance with an embodiment of the present invention in which the web is formed in the same process from wet-laid or air-laid fibers.

In accordance with a further embodiment of the invention illustrated in FIG. 5, the web is formed in situ by using a wet laid or air laid process. FIG. 5 includes coaters 52 and 56, oven 60 and vacuum ports 54 and 59 analogous to FIG. 4. In addition, FIG. 5 illustrates a process in which a fiber supply station 70 is provided where fiber dispensers 72, 74, and 76 are provided for dispensing, for example cellulose pulp or other natural or synthetic fibers. In the embodiment illustrated in FIG. 5, the fibers may be deposited on a screen 78 and a latex may optionally be applied at station 80 to enhance the strength of the web. The web may be dried in oven 82 and then coated as described with respect to FIG. 4.

Figure 6:
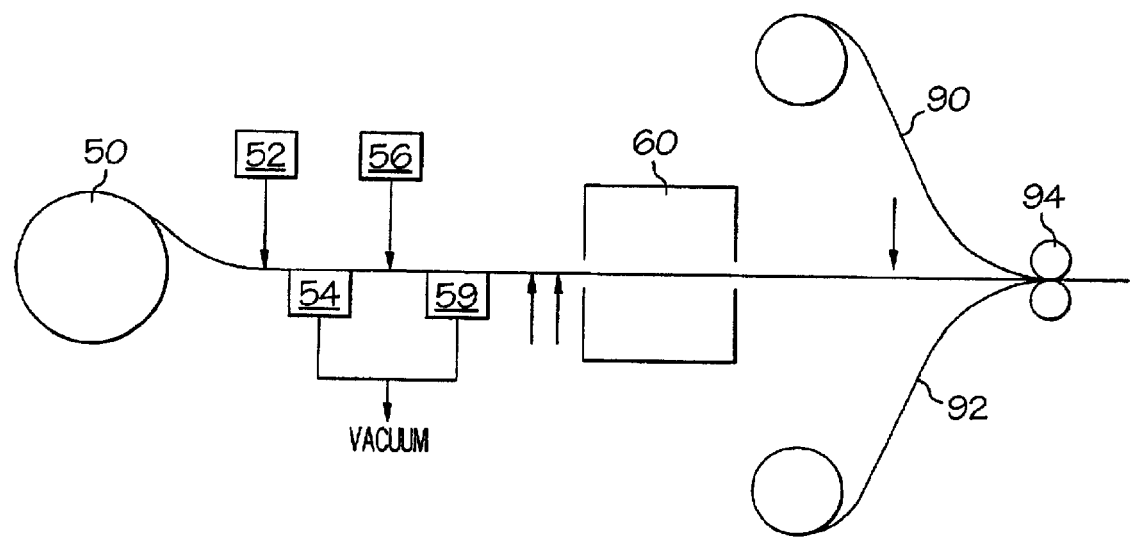
FIG. 6. is a schematic illustration of one process for manufacturing a multi-layer dye-scavenging laundry article in accordance with the present invention.

In still another embodiment of the invention illustrated in FIG. 6, a multi-layer product may be formed. FIG. 6 illustrates coaters 52 and 56, oven 60 and vacuum ports 54 and 59 analogous to FIG. 4. In accordance with this embodiment of the invention, the web 50 is assembled with webs 90 and 92 such that the web 50 is sandwiched between the other webs. The assembled webs are bonded together at bonding station 94 using any conventional technique such as adhesive bonding, sonic bonding or pressure bonding.

EXAMPLES

In the following examples various non-woven webs were used as rolled goods supplied by Buckeye Technologies, Memphis, Tenn., USA. These non-woven webs were made from wood pulp, bi-component (PE/PP) fiber, and adhesives using methods widely known in the art. The webs were about 50 cm wide and ranged from 80–140 gsm, had a caliper ranging from 1–5 mm, and were about 1 m long. PAE resin sold under the name Kymene was supplied by Hercules Inc., Wilmington, Del., USA. Polyvinyl pyrrolidone co-vinyl imidazole (PVPVI) sold under the name Sokolan HP 56 was supplied by BASF AG, Germany. Polyvinylpyridine N oxide (PNVO) was supplied by Reilly Industries, Indianapolis, Ind., USA. IEO refers to imidazole-epichlorohydrin oligomer. EQHMD refers to hexamethylenediamine tetra-E24 ethoxylate. All the slot die applicators used in these examples were MR 1300 applicators supplied by ITW Dynatec, Hendersonville, Tenn. All nozzles used were supplied by Spraying Systems Inc, Wheaton, Ill., USA.

Example 1

A combination of water soluble chemicals were mixed together in a 15 gallon tank based on the composition tabulated below. A stream "A" from this tank having a concentration of about 30% was pumped at a rate of about 5.6 kg/hr through slot die coater # 1 and delivered a coating onto a 120 gsm, 50 cm wide non-woven web moving at 1.5 m/min. Next, a stream "B" of Kymene was fed from another tank at a rate of 4.2 kg/hr through a second slot die coater #2 onto the same side of the web over the first layer delivered by slot coater #1. The continuously moving web then entered a forced air convection oven operating at 150C. The moisture content of the web exiting the oven was below 10%. The total amount of wet coating delivered to the web was about 255 gsm and total amount of solids deposited on the web after drying was about 58 gsm.

TABLE 1

| Stream | | | % Active | $g/m^2$ Dry Basis | $g/m^2$ Wet Basis |
|---|---|---|---|---|---|
| B | Slot Coater #2 | Kymene | 12.5 | 13.57 | 108.60 |
| A | Slot Coater #1 | PVPVI | 30 | 40.72 | 135.75 |
| | | PVNO | 40 | 4.52 | 11.31 |
| | | Total | | 58.82 | 255.66 |

Example 2

A combination of water soluble chemicals were mixed together in a 50 gallon tank based on the composition tabulated below. A stream "A" from this tank having a concentration of about 32% was pumped at a rate of 63.9 kg/hr through slot die coater # 1 and delivered a coating onto a 120 gsm, 50 cm wide non-woven web moving at 15 m/min. Next, a stream "B" of Kymene was fed from another tank at a rate of 42.0 kg/hr through a second slot die coater #2 onto the same side of the web over the first layer delivered by slot coater #1. The continuously moving web then entered a forced air convection oven operating at 150C. The moisture content of the web exiting the oven was below 10%. The total amount of wet coating delivered to the web was about 273 gsm and total amount of solids deposited on the web after drying was about 67 gsm.

TABLE 2

| Stream | | | % Active | $g/m^2$ Dry Basis | $g/m^2$ Wet Basis |
|---|---|---|---|---|---|
| B | Slot Coater #2 | Kymene | 12.5 | 13.57 | 108.60 |
| A | Slot Coater #1 | PVPVI | 30 | 40.72 | 135.75 |
| | | PVNO | 40 | 4.52 | 11.31 |
| | | IEO | 50 | 9.05 | 18.10 |
| | | Total | | 67.87 | 273.76 |

Example 3

A combination of water soluble chemicals were mixed together in a heated 50 gallon tank to about 60–70C based on the composition tabulated below. A stream "A" from this tank having a concentration of about 47.5% and containing a surfactant was foamed at a rate of 47.9 kg/hr onto the top side of a 50 cm wide, 120 gsm non-woven web moving at 15 m/min using foaming equipment known in the art for coating webs and supplied by Gaston County, N.C., USA. The surfactant known as Amphosol CA was supplied by Stepan, Ill., USA. Next, a stream "B" of Kymene was fed from another tank at a rate of 13.1 kg/hr Kymene was sprayed onto the same top side of the web sing fine spraying nozzles supplied by Spraying Systems Inc, Ill., USA. The continuously moving web then entered a forced air convection oven operating at 150C. The moisture content of the web exiting the oven was less than 10%. The total amount of wet coating delivered to the web was about 157 gsm and total amount of solids deposited on the web after drying was about 72 gsm.

TABLE 3

| Stream | | | % Active | g/m² Dry Basis | g/m² Wet Basis |
|---|---|---|---|---|---|
| B | Slot Coater #2 | Kymene | 40 | 13.57 | 33.94 |
| A | Slot Coater #1 | Surfactant | 35 | 4.52 | 12.93 |
|   |   | PVPVI | 50 | 40.72 | 81.45 |
|   |   | PVNO | 40 | 4.52 | 11.31 |
|   |   | IEO | 50 | 9.05 | 18.10 |
|   |   | Total |   | 72.40 | 157.72 |

Example 4

A combination of water soluble chemicals were mixed together in a heated 50 gallon tank to about 60–70C based on the composition tabulated below. A stream "A" from this tank having a concentration of about 49% was pumped through a slot die coater #1 at a rate of 50 kg/hr onto the top side of a 50 cm wide, 120 gsm non-woven web moving at 15 m/. The web was then passed over a rectangular vacuum slot, approximately 1 inch in width positioned along the width of the web to enhance the penetration of the liquid coat into the web. Next, a stream "B" of Kymene and surfactant Amphosol CG was fed from another tank at a rate of 21 kg/hr and foamed onto the top side of the web using foaming equipment known in the art for coating webs and supplied by Gaston County, N.C., USA. The web was then passed over another vacuum slot similar to the first. The continuously moving web then entered a forced air convection oven operating at 150C. The moisture content of the web exiting the oven was less than 10%. The total amount of wet coating delivered to the web was about 157 gsm and total amount of solids deposited on the web after drying was about 72 gsm.

TABLE 4

|   |   | % Active | g/m² Dry Basis | g/m² Wet Basis |
|---|---|---|---|---|
| Slot Coater #2 | Kymene | 40 | 13.57 | 33.94 |
|   | Surfactant | 35 | 4.52 | 12.93 |
| Slot Coater #1 | PVPVI | 50 | 40.72 | 81.45 |
|   | PVNO | 40 | 4.52 | 11.31 |
|   | IEO | 50 | 9.05 | 18.10 |
|   | Total |   | 72.40 | 157.72 |

Example 5

A 60% solution of PVPVI was prepared in a 150 gallon tank and kept at 50C. In another 150 gallon tank, a mixture of PVNO, surfactant Amphosol CA, and ABE-base were mixed together at 40C based on the composition tabulated below and having a concentration of about 45%. Stream "A" consisting of only PVPVI was applied at a rate of 53.7 kg/hr using a slot die applicator #1 to the top side of a 100 gsm web moving at 30 m/min. The web was passed over a vacuum slot similar to the one in example 4 enhanced the penetration of PVPVI into the web. Immediately after, the same side of the web was further coated with a stream "B" consisting of 40% Kymene using a slot die applicator #2 at a rate of 26.8 kg/hr. After that, a stream "C" consisting of the mixture mentioned above, was deposited onto the bottom side of the web using die slot coater #3 at a rate of 23.3 kg/hr. The continuously moving web then entered a forced air convection oven operating at 150C. The moisture content of the web exiting the oven was below 15%. The web was then passed over a drum dryer operating at 120C which dropped the web moisture to less than 10%. The total amount of wet coating delivered to the web was about 131 gsm and total amount of solids deposited on the web after drying was about 68 gsm.

TABLE 5

| Stream |   | % Active | g/m² Dry Basis | g/m² Wet Basis |
|---|---|---|---|---|
| B | Kymene | 40 | 13.57 | 33.94 |
| A | PVPVI | 60 | 40.72 | 67.87 |
| C | PVNO | 40 | 4.52 | 11.31 |
|   | IEO | 50 | 9.05 | 18.10 |
|   | Total |   | 67.87 | 131.22 |

Example 6

The process set-up used in Example 5 was used again where stream A, B, and C were delivered at a rate of 32.2 kg/hr, 13.4 kg/hr and 11.65 kg/hr respectively to a similar web moving at a rate of 15 m/min. Upon exiting the oven the drum dryer was not used. A stream D consisting of molten PB-base at about 60C was applied to the top side of the web through a heated slot die coater #4 at a rate of 17.9 kg/hr. PB-base was melted and metered using Nordson Engineering GmbH melt/metering equipment model MX3400 supplied by JM Labs, Georgia, USA. The web was then conveyed over three chill rolls operating at 5C. Upon leaving the third chill roll, the molten material was solidified. The total amount of coating delivered to the web before the chill rolls was 145 gsm on a wet basis and 68 gsm on a dry basis. The total amount delivered post chill rolls was about 113 gsm.

TABLE 6

| Stream |   | % Active | g/m² Dry Basis | g/m² Wet Basis |
|---|---|---|---|---|
| B | Kymene | 40 | 13.57 | 33.94 |
| A | PVPVI | 50 | 40.72 | 81.45 |
| C | PVNO | 40 | 4.52 | 11.31 |
|   | IEO | 50 | 9.05 | 18.10 |
| D | EQHMD | 100 | 45.25 | 45.25 |
|   | Total |   | 113.12 | 190.05 |

Example 7

Example 6 was repeated again but stream D consisted of a combination of PB-base, PEG MW4000, and cyclodextrin perfume encapsulates as shown below. Stream D was handled as described in example 6 and was delivered to the web at a rate of 17.9 kg/hr. The total amount delivered post chill rolls was about 113 gsm.

TABLE 7

| Stream |   | % Active | g/m² Dry Basis | g/m² Wet Basis |
|---|---|---|---|---|
| B | Kymene | 40 | 13.57 | 33.94 |
| A | PVPVI | 50 | 40.72 | 81.45 |
| C | PVNO | 40 | 4.52 | 11.31 |
|   | IEO | 50 | 9.05 | 18.10 |

TABLE 7-continued

| Stream | | % Active | g/m² Dry Basis | g/m² Wet Basis |
|---|---|---|---|---|
| D | EQHMD | 100 | 18.1 | 18.10 |
| | PEG 4000 | 100 | 18.1 | 18.10 |
| | Cyclodextrin Perfume | 100 | 9.05 | 9.05 |
| | Encapsulates | | | |
| | Total | | 113.12 | 190.05 |

Example 8

A 50% solution of PVPVI was prepared in a 50 gallon tank and kept at 50C. Stream "A" consisting of only PVPVI was applied at a rate of 32.2 kg/hr using a slot die applicator #1 to the top side of a 120 gsm web moving at 15 m/min. Using a slot die applicator #2 positioned immediately after the first one, a stream B was supplied to at a rate of 23.9 kg/hr from another tank containing 15% polyvinylformamide (PVFA). The two applicators delivered continuous or intermittent interspaced stripes of PVPVI and PVFA along the width of the web. The web was passed over a vacuum slot similar to the one in example 4 which enhanced the penetration of PVPVI and PVFA into the web. Immediately after, the top side of the web was further coated with a stream "C" consisting of 40% Kymene using aslot die applicators #3 at a rate of 26.8 kg/hr. The continuously moving web then entered a forced air convection oven operating at 150C. The moisture content of the web exiting the oven was below 15%. The web was then passed over a drum dryer operating at 120C which dropped the web moisture to less than 10%. The total amount of wet coating delivered to the web was about 209 gsm and total amount of solids deposited on the web after drying was about 76 gsm.

TABLE 8

| Stream | | % Active | g/m² Dry Basis | g/m² Wet Basis |
|---|---|---|---|---|
| C | Kymene | 40 | 27.15 | 67.87 |
| A | PVPVI | 50 | 40.72 | 81.45 |
| C | PVFA | 15 | 9.05 | 60.33 |
| | Total | | 76.92 | 209.65 |

Example 9

A 50% solution of PVPVI was prepared in a 50 gallon tank and kept at 50C. Stream "A" consisting of only PVPVI was applied at a rate of 32.2 kg/hr using a slot die applicator #1 to the top side of a 140 gsm web moving at 15 m/min. Using a slot die applicator #2 positioned immediately after the first one, a stream B was supplied to at a rate of 23.9 kg/hr from another tank containing 15% polyvinylformamide (PVFA). The two applicators delivered continuous or intermittent interspaced stripes of PVPVI and PVFA along the width of the web. The web was passed over a vacuum slot similar to the one in example 4 which enhanced the penetration of PVPVI and PVFA into the web.

Immediately after, the top side of the web was further coated with a stream "C" consisting of 40% Kymene using aslot die applicators #3 at a rate of 26.8 kg/hr. Immediately after, a stream consisting of a mixture of chemicals as tabulated below having a concentration of about 43% delivered to the bottom side of the web through a slot die applicator #4 at a rate of 16.7 kg/hr. The continuously moving web then entered a forced air convection oven operating at 150C. The moisture content of the web exiting the oven was below 15%. The web was then passed over a drum dryer operating at 120C which dropped the web moisture to less than 10%. The total amount of wet coating delivered to the web was about 252 gsm and total amount of solids deposited on the web after drying was about 95 gsm.

TABLE 9

| Stream | | % Active | g/m² Dry Basis | g/m² Wet Basis |
|---|---|---|---|---|
| C | Kymene | 40 | 27.15 | 67.87 |
| A | PVFA | 15 | 9.05 | 60.33 |
| B | PVPVI | 50 | 40.72 | 81.45 |
| D | Surfactant | 35 | 4.52 | 12.93 |
| | PVNO | 40 | 4.52 | 11.31 |
| | IEO | 50 | 9.05 | 18.10 |
| | Total | | 95.02 | 251.99 |

Example 10

A 50% solution of PVPVI was prepared in a 5 gallon tank and kept at 50C. Stream "A" consisting of only PVPVI was applied at a rate of 3.2 kg/hr using a slot die applicator #1 to the top side of a 120 gsm web moving at 1.5 m/min. Immediately after, the top side of the web was further coated with a stream "B" consisting of 40% Kymene using a slot die applicators #2 at a rate of 1.3 kg/hr. The web was passed over a vacuum slot similar to the one in example 4 which enhanced the penetration of PVPVI and Kymene into the web. The continuously moving web then entered a forced air convection oven operating at 150C. Immediately after the oven, a stream C was supplied to the bottom side of the web using a slot die applicator #3 at a rate of 2.3 kg/hr from another tank containing 15% polyvinylformamide (PVFA). Immediately after, the bottom side of the web was further coated with a stream "D" consisting of 40% Kymene using a slot die applicators #4 at a rate of 1.3 kg/hr. The web was passed over a vacuum slot similar to the one in example 4 which enhanced the penetration of PVFA and Kymene into the web. The continuously moving web then entered a forced air convection oven operating at 150C. The moisture content of the web exiting the second oven was below 10%. The total amount of wet coating delivered to the web was about 209 gsm and total amount of solids deposited on the web after drying was about 76 gsm.

TABLE 10

| Stream | | % Active | g/m² Dry Basis | g/m² Wet Basis |
|---|---|---|---|---|
| B | Kymene | 40 | 13.57 | 33.94 |
| A | PVPVI | 50 | 40.72 | 81.45 |
| D | Kymene | 40 | 13.57 | 33.94 |
| C | PVFA | 15 | 9.05 | 60.33 |
| | Total | | 76.92 | 209.65 |

Having described the invention in detail and by reference to specific embodiments thereof, it will be apparent that numerous variations and modifications are possible without departing from the spirit and scope of the invention as defined by the following claims.

What is claimed is:

1. A method for manufacturing a laundry additive article comprising:
   (a) providing a web of an insoluble substrate;
   (b) applying a coating of a polymerizable or crosslinkable dye or particulate soil absorber to at least one face of the web, wherein the dye or particulate soil absorber is a polymeric cyclic amine;

(c) applying a cross-linker for the dye or particulate soil absorber to the web; and (d) reacting the cross-linker with the dye or particulate soil absorber, wherein application of the coating and cross-linker can be performed in either order.

2. A method for manufacturing a laundry additive article comprising:

(a) providing a web of an insoluble substrate;

(b) applying a coating of a polymerizable or crosslinkable dye or particulate soil absorber to at least one face of the web, wherein the dye or particulate soil absorber is selected from the group consisting of polymers, oligomers, prepolymers, monomers and mixtures thereof, having functional groups selected from the group consisting of hydroxyl, amine, ester, ketone, amide, isocyanate, and mixtures thereof;

(c) applying a cross-linker for the dye or particulate soil absorber to the web, wherein the cross-linker is selected from the group consisting of epihalohydrins, bishalohydrins of diols, bishalohydrins of polyalkylene glycols, bishalohydrins of polytetrahydrofurans, alkylene dihalides, alkylene trihalides, bisepoxides, trisepoxides, tetraepoxides, and mixtures thereof, and (d) reacting the cross-linker with the dye or particulate soil absorber, wherein application of the coating and the cross-linker can be performed in either order.

3. The method of claim 1 wherein the dye or particulate soil absorber is polyvinyl pyrrolidone co-vinyl imidazole.

4. The method of claim 2 wherein the cross-linker is polyamine epichlorohydrin (PAE) resin.

5. The method of claim 3 wherein the web is paper.

6. A method for manufacturing a laundry additive article comprising:

(a) providing a web of an insoluble substrate;

(b) applying a coating of a polymerizable or crosslinkable dye or particulate soil absorber to at least one face of the web;

(c) applying a cross-linker for the dye or particulate soil absorber to the web; and (d) reacting the cross-linker with the dye or particulate soil absorber, wherein application of the coating and the cross-linker can be performed in either order;

(e) applying additional additive to the substrate, wherein an the additional additive is applied to the substrate as a waxy or hot melt composition, and contacting the substrate with a chill roller to fix the waxy or hot melt composition to the surface of the substrate.

7. A method for manufacturing a laundry additive article comprising:

(a) providing a web of an insoluble substrate;

(b) applying a coating of a polymerizable or crosslinkable dye or particulate soil absorber to at least one face of the web, wherein the dye absorber is aromatic;

(c) applying a cross-linker for the dye or particulate soil absorber to the web; and (d) reacting the cross-linker with the dye or particulate soil absorber, wherein application of the coating and the cross-linker can be performed in either order.

* * * * *